US012665940B2

(12) United States Patent
Pezeshki et al.

(10) Patent No.: US 12,665,940 B2
(45) Date of Patent: Jun. 23, 2026

(54) METHODS AND APPARATUS FOR SYNCHRONOUS HTTP MEDIA PLAYBACK

(71) Applicant: DIRECTV, LLC, El Segundo, CA (US)

(72) Inventors: Reza Pezeshki, Chevy Chase, MD (US); Richard Tatem, Middletown, MD (US); Horia-Mihai Popa, Iasi (RO); Bogdan Livadariu, Valea Lupului (RO); Wassim Daccache, Ellicott City, MD (US)

(73) Assignee: DIRECTV, LLC, El Segundo, CA (US)

( * ) Notice: Subject to any disclaimer, the term of this patent is extended or adjusted under 35 U.S.C. 154(b) by 12 days.

(21) Appl. No.: 18/744,170

(22) Filed: Jun. 14, 2024

(65) Prior Publication Data

US 2024/0364767 A1 Oct. 31, 2024

Related U.S. Application Data

(63) Continuation of application No. 18/309,537, filed on Apr. 28, 2023, now Pat. No. 12,081,608.

(51) Int. Cl.
*H04L 65/65* (2022.01)
*H04L 65/611* (2022.01)
(Continued)

(52) U.S. Cl.
CPC ............ *H04L 65/65* (2022.05); *H04L 65/611* (2022.05); *H04L 67/02* (2013.01); *H04N 21/8547* (2013.01)

(58) Field of Classification Search
CPC ........... H04N 32/64707; H04N 21/633; H04N 21/434; H04N 21/36; H04L 65/611
See application file for complete search history.

(56) References Cited

U.S. PATENT DOCUMENTS 7,082,142 B1 7/2006 Begeja
7,675,901 B2 * 3/2010 Wang ............... H04N 21/64707
455/414.1

(Continued)

FOREIGN PATENT DOCUMENTS

CN 100525377 C 8/2009
CN 101938633 A 1/2011
(Continued)

OTHER PUBLICATIONS

United States Patent and Trademark Office, "Non-Final Rejection," issued on Sep. 27, 2022 in connection with U.S. Appl. No. 17/388,486, 14 pages.
(Continued)

*Primary Examiner* — Chirag R Patel
(74) *Attorney, Agent, or Firm* — Hanley, Flight & Zimmerman, LLC

(57) ABSTRACT

Systems, apparatus, articles of manufacture, and methods are disclosed to synchronize media playback at devices in a multicast environment. Disclosed is a system to synchronize media playback, the system comprising programmable circuitry, and a memory that stores executable instructions that, when executed or instantiated by the programmable circuitry, facilitate performance of operations, comprising transmitting, using a hypertext transfer protocol (HTTP), a first request in a first HTTP message to a first client device and to a second client device, receiving, from the first client device in response to the first request. a first time stamp associated with a first presentation, the first time stamp representing a first playback time within the first presentation, receiving, from the second client device in response to the first request, a second time stamp associated with a second presentation, the second time stamp representing a second playback time within the second presentation, calculating a time difference between the first time stamp and (Continued)

the second time stamp, determining whether the time difference satisfies a threshold, transmitting a second HTTP message to the first client device and the second client device in response to a determination that the time difference fails to satisfy the threshold, the second HTTP message to cause the first client device to pause the first presentation and the second client device to pause the second presentation, transmitting seek instructions in a third HTTP message to the second client device, the seek instructions to cause the second client device to synchronize the second presentation to the first presentation by setting the first and second playback times equal, and transmitting a fourth HTTP message to cause the first client device to resume the first presentation and the second client device to resume the second presentation.

20 Claims, 12 Drawing Sheets

(51) Int. Cl.
H04L 67/02 (2022.01)
H04N 21/8547 (2011.01)

(56) References Cited

U.S. PATENT DOCUMENTS

| | | | |
|---|---|---|---|
| 8,261,314 B2 | 9/2012 | Riha | |
| 8,707,382 B2 | 4/2014 | Wollmershauser et al. | |
| 8,803,811 B2 * | 8/2014 | Kondo | H04N 21/42204 |
| | | | 345/169 |
| 9,094,578 B2 | 7/2015 | Newell | |
| 9,210,204 B2 | 12/2015 | Crowe et al. | |
| 9,407,687 B2 | 8/2016 | Long | |
| 9,420,026 B2 | 8/2016 | Baldwin et al. | |
| 9,781,485 B2 * | 10/2017 | Russell | H04N 21/44227 |
| 10,085,075 B2 | 9/2018 | Lam et al. | |
| 10,182,269 B1 * | 1/2019 | Samant | H04N 21/2187 |
| 10,237,315 B2 | 3/2019 | Baldwin | |
| 10,397,289 B2 | 8/2019 | Jennings et al. | |
| 10,430,560 B2 | 10/2019 | Baldwin et al. | |
| 10,536,741 B1 | 1/2020 | Madison et al. | |
| 10,693,932 B2 | 6/2020 | Baldwin | |
| 10,917,681 B2 | 2/2021 | Feng et al. | |
| 11,412,018 B2 | 8/2022 | Baldwin et al. | |
| 12,041,324 B2 * | 7/2024 | Jackson | H04J 3/0635 |
| 2001/0039659 A1 | 11/2001 | Simmons et al. | |
| 2002/0016776 A1 | 2/2002 | Chu et al. | |
| 2002/0059144 A1 | 5/2002 | Meffert et al. | |
| 2003/0037261 A1 | 2/2003 | Meffert et al. | |
| 2004/0073930 A1 * | 4/2004 | Demas | H04N 21/434 |
| | | | 725/74 |
| 2005/0060584 A1 | 3/2005 | Ginter et al. | |
| 2005/0138357 A1 | 6/2005 | Swenson et al. | |
| 2005/0198322 A1 | 9/2005 | Takabayashi et al. | |
| 2006/0280303 A1 | 12/2006 | Gupte | |
| 2008/0086779 A1 | 4/2008 | Blake et al. | |
| 2009/0150982 A1 | 6/2009 | Kim | |
| 2012/0166628 A1 | 6/2012 | Kullos | |
| 2012/0324519 A1 | 12/2012 | Laughlin | |
| 2013/0067116 A1 | 3/2013 | Ostergren | |
| 2013/0128889 A1 | 5/2013 | Mathur et al. | |
| 2013/0346564 A1 | 12/2013 | Warrick et al. | |
| 2015/0288617 A1 | 10/2015 | Dasher et al. | |
| 2015/0288732 A1 | 10/2015 | Phillips et al. | |
| 2015/0341683 A1 * | 11/2015 | Amidei | H04N 21/2387 |
| | | | 725/93 |
| 2017/0251235 A1 | 8/2017 | Sanders | |
| 2018/0184145 A1 | 6/2018 | Pichon et al. | |
| 2018/0373847 A1 | 12/2018 | Lo et al. | |
| 2019/0140884 A1 | 5/2019 | Liu et al. | |
| 2019/0141383 A1 | 5/2019 | Kageyama et al. | |
| 2019/0379713 A1 | 12/2019 | Casey et al. | |
| 2021/0281906 A1 | 9/2021 | Kiryanov et al. | |
| 2021/0289255 A1 | 9/2021 | Balint et al. | |
| 2022/0070242 A1 | 3/2022 | Bhatt et al. | |
| 2023/0007064 A1 | 1/2023 | Yang et al. | |
| 2023/0034793 A1 | 2/2023 | Pezeshki et al. | |
| 2023/0088143 A1 | 3/2023 | Wang et al. | |
| 2023/0379527 A1 | 11/2023 | Ickman et al. | |

FOREIGN PATENT DOCUMENTS

| | | |
|---|---|---|
| CN | 101895750 B | 5/2012 |
| CN | 111935511 B | 2/2021 |
| CN | 113595991 A | 11/2021 |

OTHER PUBLICATIONS

United States Patent and Trademark Office, "Final Rejection," issued on Mar. 29, 2023 in connection with U.S. Appl. No. 17/388,486, 19 pages.

United States Patent and Trademark Office, "Non-Final Rejection," issued on Sep. 8, 2022 in connection with U.S. Appl. No. 17/478,291, 9 pages.

United States Patent and Trademark Office, "Final Rejection," issued on Feb. 23, 2023 in connection with U.S. Appl. No. 17/478,291, 12 pages.

United States Patent and Trademark Office, "Non-Final Rejection," issued on Jul. 13, 2023 in connection with U.S. Appl. No. 17/478,291, 10 pages.

United States Patent and Trademark Office, "Final Rejection," issued on Jan. 26, 2024 in connection with U.S. Appl. No. 17/478,291, 11 pages.

United States Patent and Trademark Office, "Notice of Allowance and Fees Due" issued on Jun. 11, 2024 in connection with U.S. Appl. No. 17/478,291, 8 pages.

* cited by examiner

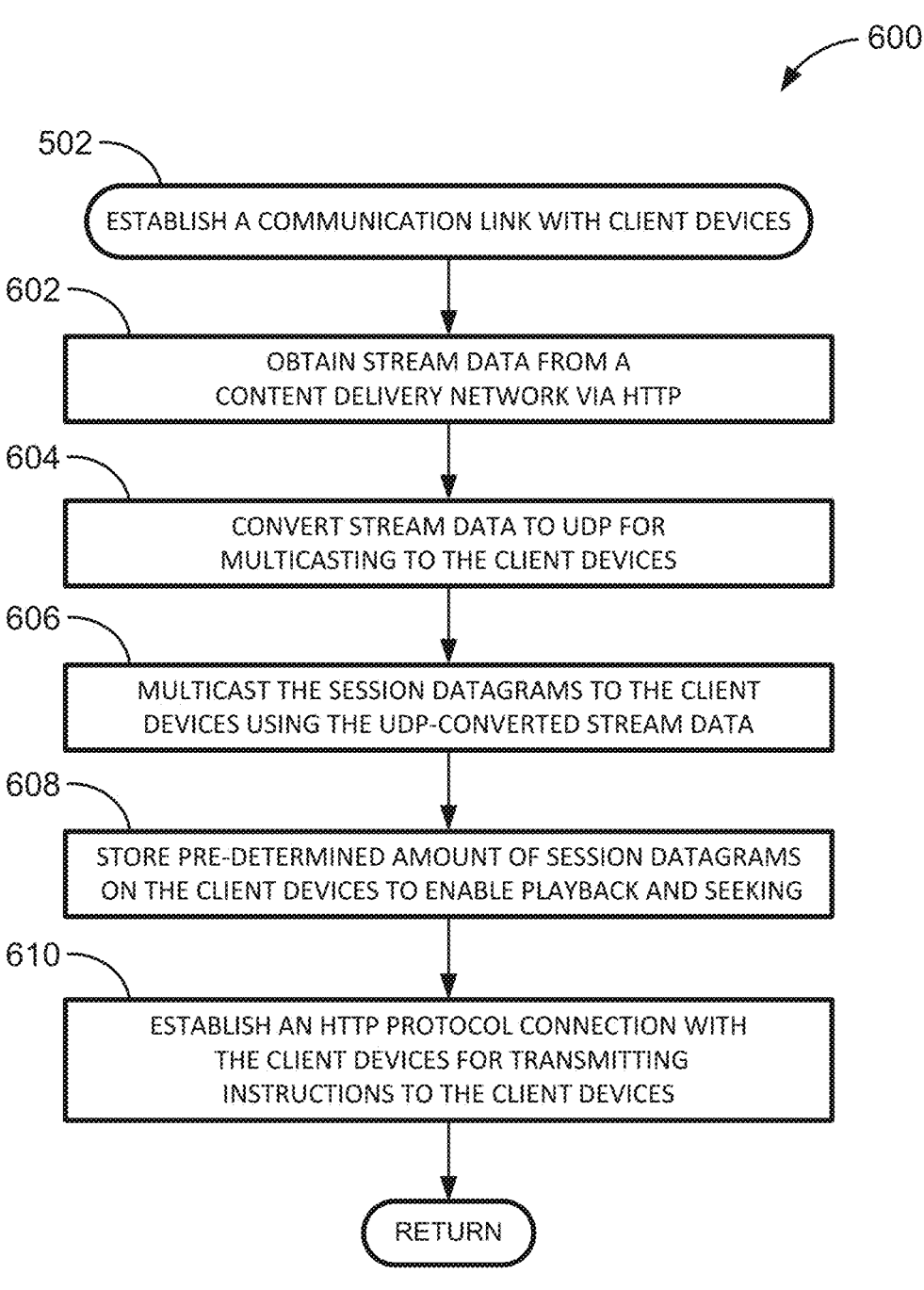

600

502 — ESTABLISH A COMMUNICATION LINK WITH CLIENT DEVICES

602 — OBTAIN STREAM DATA FROM A
CONTENT DELIVERY NETWORK VIA HTTP

604 — CONVERT STREAM DATA TO UDP FOR
MULTICASTING TO THE CLIENT DEVICES

606 — MULTICAST THE SESSION DATAGRAMS TO THE CLIENT
DEVICES USING THE UDP-CONVERTED STREAM DATA

608 — STORE PRE-DETERMINED AMOUNT OF SESSION DATAGRAMS
ON THE CLIENT DEVICES TO ENABLE PLAYBACK AND SEEKING

610 — ESTABLISH AN HTTP PROTOCOL CONNECTION WITH
THE CLIENT DEVICES FOR TRANSMITTING
INSTRUCTIONS TO THE CLIENT DEVICES

RETURN

FIG. 6

METHODS AND APPARATUS FOR SYNCHRONOUS HTTP MEDIA PLAYBACK

FIELD OF THE DISCLOSURE

This disclosure relates generally to content delivery networks and, more particularly, to methods and apparatus for synchronous HTTP media playback.

BACKGROUND

In recent years, the number of devices within a given location that support media playback has increased. Conventionally, delivery of media content to multiple devices utilized a unicast architecture in which a content delivery network supports n different transmissions of the same media from a content provider to n different devices. In unicast systems, separate copies of the media content are delivered to each of the n different devices as a HTTP stream.

BRIEF DESCRIPTION OF THE DRAWINGS

FIG. 6 is a flowchart representative of example machine readable instructions and/or example operations that may be executed, instantiated, and/or performed by example programmable circuitry to establish a communication link between the head end and the client devices of FIG. 2

Figure 1:
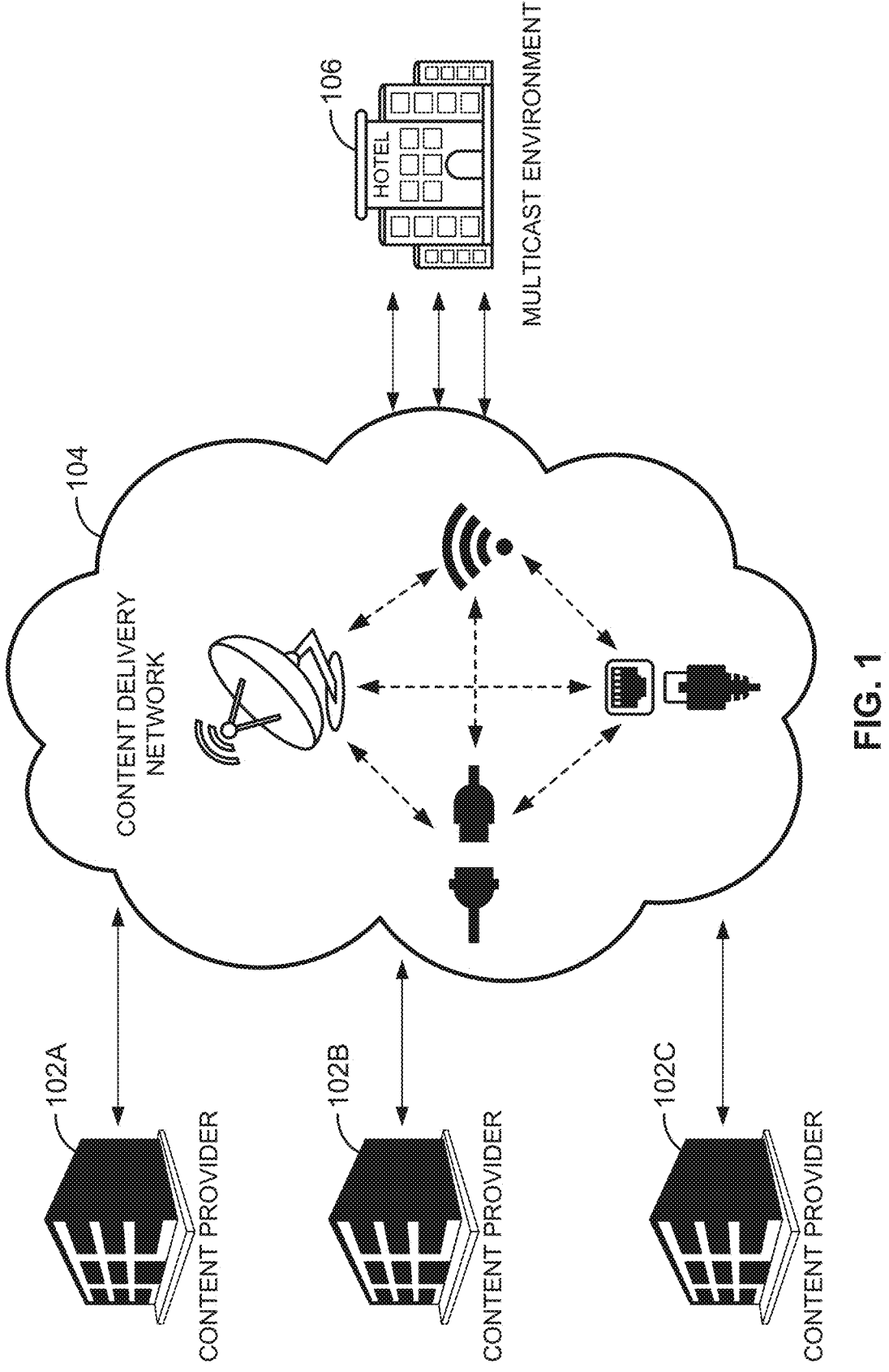
FIG. 1 is an illustrative example of a content delivery network.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, Network Processing Units (NPUs) one or more microcontrollers that may execute first instructions to perform one or more operations and/or functions and/or integrated circuits such as Application Specific Integrated Circuits (ASICs). Additionally, the programmable circuitry may be implemented as an XPU that may be implemented by a heterogeneous computing system including multiple types of the above programmable circuitry (e.g., one or more FPGAs, one or more CPUs, one or more GPUs, one or more NPUs, one or more DSPs, etc., and/or any combination(s) thereof). The XPU may include orchestration technology (e.g., application programming interface(s) (API(s)) that may assign computing task(s) to whichever one(s) of the multiple types of programmable circuitry is/are suited and available to perform the computing task(s).

DETAILED DESCRIPTION

In some use cases, unicast systems struggle to support efficient content delivery. For example, consider an environment that includes both: (1) a large number of devices requesting media, and (2) legacy communications infrastructure having relatively limited total network traffic bandwidth. Such environments may include, but are not limited to, hotels, malls, restaurants, sports bars, other commercial spaces, multiple dwelling units (MDUs), residential dwellings, etc.

If such example environments utilize a unicast content delivery network, a sufficiently large number of devices (n) requesting media at the same time can result in the need to transmit data that exceeds (or constitutes a disproportionate amount of) the total network traffic bandwidth available in the environment. As a result, one or more media playback sessions in the environment may experience a decrease in quality due to buffering, disconnections, etc. Additionally or alternatively, the large request for data from the n devices requesting media may cause other devices (e.g., phones, tablets, laptops) attempting to use the environment's local network to experience disconnections or other latencies. In some examples, a device requesting media is referred to as a client device.

Multicast content delivery systems may be utilized to decrease total network traffic and improve user experiences. In a multicast architecture, a content delivery network enables one transmission of a media stream from a content provider to a primary device (e.g., a server) located within the example environment. The primary device then transmits n copies of the media stream to the n devices within the environment requesting the media. Using multicast, the number of transmissions (e.g., channels of communication dedicated to a particular media stream) between the example environment and the content delivery network is reduced from n to 1, thereby decreasing the total network traffic and improving user experiences. As used above and herein, a media stream refers to data used to enable playback of a piece of media (e.g., a movie, a television show, a television channel, a live stream, etc.). Multicast content delivery networks are discussed further in connection with FIGS. 1 and 2.

Some viewers in the same environment (e.g., same bar, same hotel room lobby, etc.) are seeing streamed content on multiple devices. When devices are out of synch, one device is showing a different image/play back media than another device or a different time stamp of the image/play back media. Previously, devices attempting to synchronize media across multiple devices do so at a primary device (e.g., a device that controls the play back of all devices connected to the primary device) or based on a primary media playback device. For example, primary devices create multiple instances of a media playback for the devices playing the media. The primary device controls the media playback by synchronizing the feeds prior to sending the media to the devices playing the media. This method requires heavy network utilization because the synchronizing occurs prior to the media being transmitted to the devices.

Alternatively, previous systems utilizing a primary media playback device identify one of the devices in the system/environment of devices to be a central device. All other devices are synchronized against that central device (e.g., non-central devices are synchronized to the central device). This method requires all devices to be linked together, and negates potential scenarios where devices are playing the same media but are not linked together, thus failing to provide the synchronization feature (e.g., where some devices are not connected to the network).

Example methods, systems, and apparatus described herein implement an environment that synchronizes media playback on the devices using a Hypertext Transfer Protocol (HTTP) communication protocol to reduce network traffic while still ensuring the devices can be synchronized. Disclosed herein is a system that monitors time stamps of the devices playing the media to be synchronized and provides seek instructions to instruct the devices to synchronize against each other (e.g., using all devices currently playing the media).

FIG. 1 is an illustrative example of a content delivery network. FIG. 1 includes example content providers 102A, 102B, 102C, an example content delivery network (CDN) 104, and an example multicast environment 106.

The content providers 102A, 102B, 102C each correspond to a different media stream. The media stream may be formatted as a linear television channel, video on demand (VOD) or streaming platforms, etc. The media stream may correspond to any type of content, including news, sports, television shows, movies, etc. FIG. 1 illustrates three content providers 102A, 102B, 102C for simplicity. In practice, a given device may request media from any number of content providers.

A given content provider 102A may host one or more compute devices (e.g., servers) that receive requests for content and provide a corresponding media stream via the CDN 104. The content provider 102A may transmit the media stream using User Datagram Protocol (UDP), which is optimized for the transmission of large amounts of time-sensitive data. To implement UDP, the content provider 102A segments the media stream into a set of datagrams. As used above and herein, a datagram refers to a unit of data within a UDP stream. In examples described herein, a datagram corresponds to a portion of a media stream. For example, a given datagram may contain audio and video data used to play back ten seconds of a linear television channel. The content provider 102A then sequentially transmits datagrams over the CDN 104 with metadata describing the order of the datagrams.

In FIG. 1, the CDN 104 enables communication between each of the content providers 102A, 102B, 102C and the multicast environment 106. More generally, the CDN 104 exchanges data between content providers and devices requesting media from the content providers. The data exchange may include HTTP requests and UDP datagrams as described above.

The CDN 104 may be implemented by any number of internal nodes using any number of transmission mediums and any number of communication topologies. In the illustrative example of FIG. 1, the CDN 104 is the Internet. However, the CDN 104 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc.

As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The multicast environment 106 refers to any environment with a plurality of devices requesting related media. In examples described herein, the multicast environment 106 is a hotel. In other examples, the multicast environment 106 is a sports bar, a mall, a household with multiple televisions, other commercial or residential dwellings, etc. The multicast environment 106 implements a multicast system in accordance with the teachings of this disclosure.

As part of the example multicast system, the multicast environment 106 communicates via the CDN 104 with each of the content providers 102A, 102B, 102C to request content and receive the corresponding media streams. The multicast environment 106 is discussed further in connection with FIG. 2.

Figure 2:
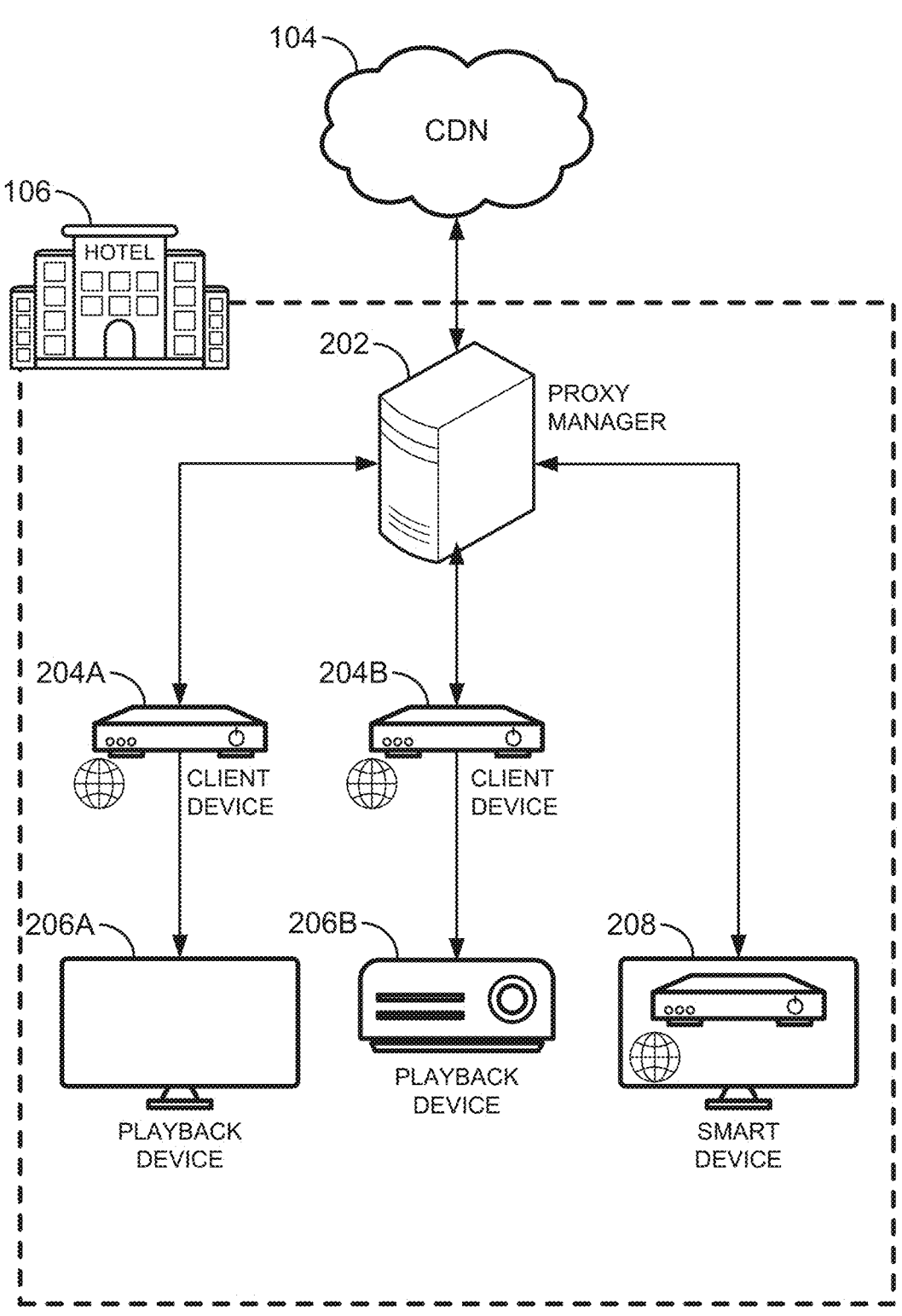
FIG. 2 is a block diagram of an example implementation of a multicast environment of FIG. 1.

FIG. 2 is a block diagram of an example implementation of the multicast environment of FIG. 1. FIG. 2 includes the CDN 104 and the multicast environment 106. The multicast environment 106 includes an example local manager 202, example client devices 204A and 204B, collectively referred to as client devices 204, example playback devices 206A and 206B, collectively referred to as playback devices 206, and an example smart device 208.

The local manager 202 is a device that multicasts media streams within the multicast environment 106 in accordance with the teachings of this disclosure. In the illustrative example of FIG. 2, the local manager 202 receives three requests for media streams from the client devices 204. The three requests each correspond to the same media stream (e.g., media from content provider 102A). Upon receiving the requests, the local manager 202 sends a single request for the media stream to the content provider 102A via the CDN 104. The local manager 202 receives a single media stream from the content provider 102A and gives one copy of said media stream to each of the client device 204A, client device 204B, and smart device 208. Advantageously, the local manager 202 avoids duplicated transmissions by analyzing the history of previous requests for media.

In general, the local manager 202 makes one request and receives one media stream over the CDN 104 per unique request generated from the client devices within the multicast environment 106. For example, suppose each of n client devices request media from one of y different media streams (meaning that y≤n, as a client device may only request one media stream for presentation at a time). In such examples, the local manager 202 makes y different transmissions over the CDN 104. The local manager 202 making y transmissions is more efficient than a unicast architecture (in which each of the client devices communicates separately over the CDN 104, causing n different transmissions). Accordingly, the multicast system for content delivery reduces network traffic when compared to unicast systems. The local manager 202 is discussed further in connection with FIG. 3.

The client devices 204 are devices that request media in accordance with the teachings of this disclosure. The client devices 204 form requests for media based on user input. The client devices 204 may use any suitable form of user input, including but not limited to button presses from a remote or software application, voice commands, etc. In some examples, one or more of the client devices 204 generate requests for both linear television channels and VoD/streaming content. In some examples, the client devices 204 include Internet connections to receive VoD user interface data.

In the illustrative example of FIG. 2, each of the client devices 204 requests the same media stream. The client devices 204 transmit the request to the local manager 202, receive the corresponding media stream, and provide the resulting media data (e.g., synchronized image and audio data) to their respective playback devices 206. The client devices 204 may communicate with the local manager 202 using any suitable LAN topologies that support both HTTP and UDP transmissions. In some examples, a client device is referred to as a set top box (STB), but client devices may take other forms such as software/apps operating on smart televisions, etc. The client devices 204 are discussed further in connection with FIG. 4.

The playback devices 206A, 206B receive the media data from the client devices 204A, 204B respectively. The playback devices 206 present the video data so it is viewable by a user. The playback devices 206 may be implemented by any device that can present media and communicate with the client devices 204. For example, in FIG. 2, the playback device 206A is a television and the playback device 206B is a projector. The playback devices 206 receive media data from the client devices 204 using any suitable communication interface. Example communication interfaces for video transmission include but are not limited to Universal Serial Bus-C (USB-C), High Definition Multimedia Interface (HDMI), Digital Visual Interface (DVI), DisplayPort, Video Graphics Array (VGA), Radio Corporation of America (RCA) cables, etc. In some examples, the playback devices 206 have internal speaker components to present the audio portion of the media. In other examples, the playback devices 206 connect to external speakers to present the audio.

The smart device 208 is a device that includes the functionality of both the client devices 204 and playback devices 206. That is, the smart device 208 forms requests for media based on user input, transmits requests for media to the local manager 202, receives a multicast media stream from the local manager 202, and presents the media on a display. In some examples, the smart device 208 includes an Internet connection to implement a web application. The smart device 208 is discussed further in connection with FIG. 4.

While FIG. 2 shows two client devices 204A, 204B and one smart device 208 for simplicity, any number of client devices 204 or smart devices 208 may be implemented within the multicast environment 106. For example, a hotel may include either a client device 204A or a smart device 208 in each hotel room so that the device used by guests to view media (e.g., either a playback device 206 or a smart device 208) receives said media as part of the multicast system. Generally, the multicast environment 106 implements one client device (e.g., client device 204A) for each playback device (e.g., playback device 206A).

FIG. 2 describes two client devices 204 and a smart device 208 that are each requesting the same media stream. The local manager 202 receives the three requests, determines if each request identifies the same media stream, and transmits only request that reaches the CDN 104. In doing so, the local manager 202 implements media multicasting and reduces the network traffic between the hotel and the CDN 104.

While multicasting techniques generally decrease network traffic between a local network (e.g., the multicast environment 106) and an external network (e.g., the CDN 104), other media multicast environments exhibit a large volume of traffic within the local network. Such other environments include local managers configured to respond to requests for media independently, which results in the unnecessary transmission of UDP streams when two devices are requesting the same media stream asynchronously.

Advantageously, the client devices 204 and smart device 208 transmits requests for media in accordance with the teachings of this disclosure. Additionally, the local manager 202 transmits UDP streams in accordance with the teachings of this disclosure. As a result, the multicast environment 106 exhibits fewer communications between devices within the local network than local managers that process requests for media independently. By avoiding extra media stream transmissions, the local manager 202 decreases internal network traffic compared to other solutions. The decrease in the amount of internal network traffic dedicated to media transfer also means the local network has more available bandwidth for internal communications. The extra bandwidth may be used to improve the performance of other functions not related to media transfer.

Figure 3:
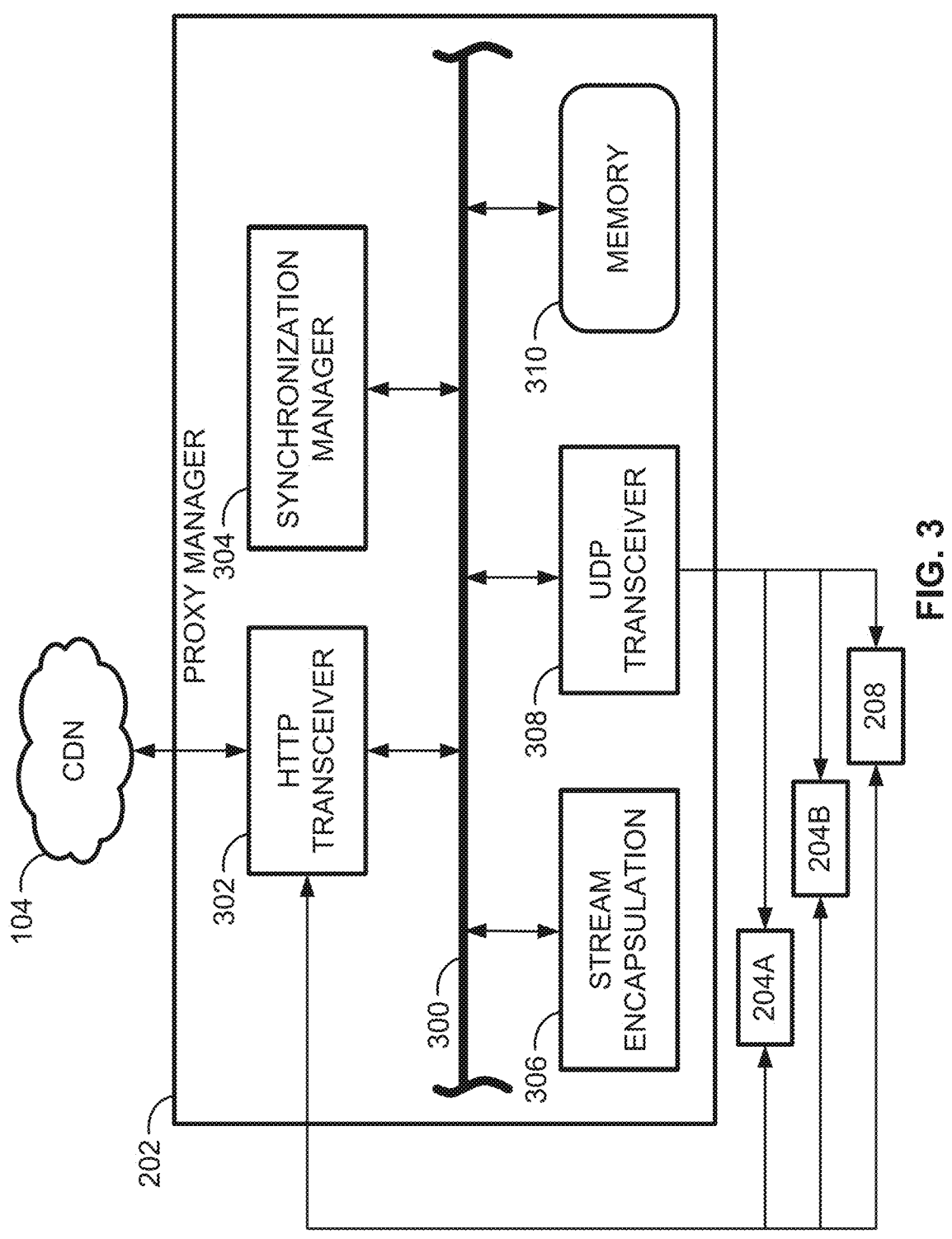
FIG. 3 is a block diagram of an example implementation of a head end server of FIG. 2 to multicast media.

FIG. 3 is a block diagram of an example implementation of the local manager 202 of FIG. 2 to multicast media. The local manager 202 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the local manager 202 of FIG. 2 may be instantiated by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

FIG. 3 includes the example CDN 104, example local manager 202, and an example client device 204A. The local manager 202 includes an example bus 300, example UDP transceiver circuitry 308, example HTTP transceiver circuitry 302, example stream encapsulation circuitry 306, example synchronization manager circuitry 304, and example memory 310.

The bus 300 refers to one or more physical connection (e.g., an interconnect, copper trace, etc.) that enables communication between the HTTP transceiver circuitry 302, synchronization manager circuitry 304, stream encapsulation circuitry 306, UDP transceiver circuitry 308, and memory 310. The bus 300 may be implemented using one or more communication systems that meet pre-determined threshold power and latency requirements.

The HTTP transceiver circuitry 302 transmits and receives data with HTTP. For example, the HTTP transceiver circuitry 302 receives HTTP requests from the client devices 204. The HTTP transceiver circuitry 302 also transmits HTTP requests to the CDN 104 and receives HTTP streams from the CDN 104. The HTTP transceiver circuitry 302 receives an instruction to transmit data from another internal component of the local manager 202 via the bus 300. Similarly, after receiving data from an external device, the HTTP transceiver circuitry 302 provides the data to another internal component of the local manager 202 via the bus 300. In some examples, the HTTP transceiver circuitry 302 is instantiated by programmable circuitry executing HTTP transceiver instructions and/or configured to perform operations such as those discussed in connection with FIGS. 5, 6, and/or 7.

The synchronization manager circuitry 304 receives HTTP stream data, manages synchronization requests, and organizes requests for media streams. The HTTP requests are generated by the client devices 204 and/or the smart device 208 and are provided to the synchronization manager circuitry 304 by the HTTP transceiver circuitry 302 via the bus 300. When the synchronization manager circuitry 304 receives two or more HTTP requests from two devices within a threshold amount of time, the synchronization manager circuitry 304 determines if the requests correspond to the same media stream. The synchronization manager circuitry 304 causes the HTTP transceiver circuitry 302 to transmit a single request, via the CDN 104, for each unique media stream identified within the two or more HTTP requests.

The synchronization manager circuitry 304 monitors and synchronizes presentation of media streams in accordance with the teachings of this disclosure. In some examples, the synchronization manager circuitry 304 provides seek instructions to one or more client devices so that a same media stream is presented synchronously across multiple playback devices 206. The synchronization manager circuitry 304 is discussed further in connection with FIGS. 5-8.

After transmitting a request for media via the CDN 104, the HTTP transceiver circuitry 302 receives an HTTP stream from a corresponding content provider (e.g., content provider 102A). As used above and herein, a HTTP stream refers to data that enables playback of media using media. Example HTTP streams include but are not limited to HTTP Live Steaming (HLS), Dynamic Adaptive Streaming over HTTP (DASH), Common Media Application Format (CMAF). In some examples, a HTTP stream enables the playback of content from the CDN 104.

The stream encapsulation circuitry 306 receives the HTTP stream from the content provider 102A via the HTTP transceiver circuitry 302 and the bus 300. The stream encapsulation circuitry 306 encapsulates the video content stream into a UDP stream. As used herein, a UDP stream refers to data that enables the communication of media utilizing UDP. A UDP stream includes one or more packets of video data that may be referred to as datagrams. In some examples, the encapsulation of the HTTP stream to a UDP stream includes one or more translation, conversion, reformatting operations, etc. In some examples, the stream encapsulation circuitry 306 is instantiated by programmable circuitry executing stream encapsulation instructions and/or configured to perform operations such as those discussed in connection with FIGS. 5 and/or 6.

The UDP transceiver circuitry 308 transmits data with the User Datagram Protocol (UDP). For example, the UDP transceiver circuitry 308 receives a UDP stream from the stream encapsulation circuitry 306 via the bus 300. The UDP transceiver transmits a copy of the UDP stream to one or more client devices 204/smart devices 208 as instructed by the synchronization manager circuitry 304. In some examples, the UDP transceiver circuitry 308 is instantiated by programmable circuitry executing UDP transceiver instructions and/or configured to perform operations such as those discussed in connection with FIG. 6.

One or both of the HTTP transceiver circuitry 302 and the UDP transceiver circuitry 308 may include any number of hardware components to support communication with external devices. The hardware components may include but are not limited to one or more cable ports for wired communications, one or more antennas for wireless communication, etc.

The memory 310 stores data used by the other internal components of the local manager 202 to multicasting. For example, the memory 310 may include one or more caches used by the stream encapsulation circuitry 306 to encapsulate an HTTP stream to a UDP stream and by the UDP transceiver circuitry 308 to form multiple copies of the UDP stream. The memory 310 may additionally store data including but not limited to a list of content providers 102, a list of media streams, a list of client devices 204.sart devices 208, an IP address of the head end, etc.

The memory 310 may be implemented as any type of memory. For example, the memory 310 may be a volatile memory or a non-volatile memory. The volatile memory may be implemented by Synchronous Dynamic Random Access Memory (SDRAM), Dynamic Random Access Memory (DRAM), and/or any other type of RAM device. The non-volatile memory may be implemented by flash memory and/or any other desired type of memory device.

In general, HTTP streams are communication protocols that build upon and/or incorporate the transmission control protocol (TCP). To begin communicating using TCP, two devices engage in a handshake process and an authentication process to identify and verify one another. While the handshake and authentication processes helps ensure accuracy and reliability, they also add latency to the data transfer process. If the local manager 202 were to transmit HTTP streams to the client devices 204 and/or the smart devices 208, the handshake and authentication processes may cause interruptions in the time sensitive process of media transfer. The interrupts may cause buffers or disconnections in the presentation of the media and decrease the quality of the user experience. Accordingly, the local manager 202 includes the stream encapsulation circuitry 306 so a media stream can be quickly and efficiently transmitted to multiple client devices 204/smart devices 208 as a UDP stream.

Further, transmitting instructions to the client devices 204/smart devices 208 to synchronize media playback via HTTP utilizes less bandwidth than synchronizing media playback at the local manager 202 prior to communicating the session datagrams. Additionally, in the multicast environment 106, bandwidth is saved by eliminating the synchronization request to client devices 204/smart devices 208 that are not within a given session (e.g., the client device 204/smart device 208 is turned off, not on the same session, disconnected from the network, etc.). The use of a single stream of media in a session and the synchronization of the media playback at the client device 204/smart device 208 playback level reduces bandwidth requirements while still ensuring media playbacks are synchronized across a session.

Figure 4:
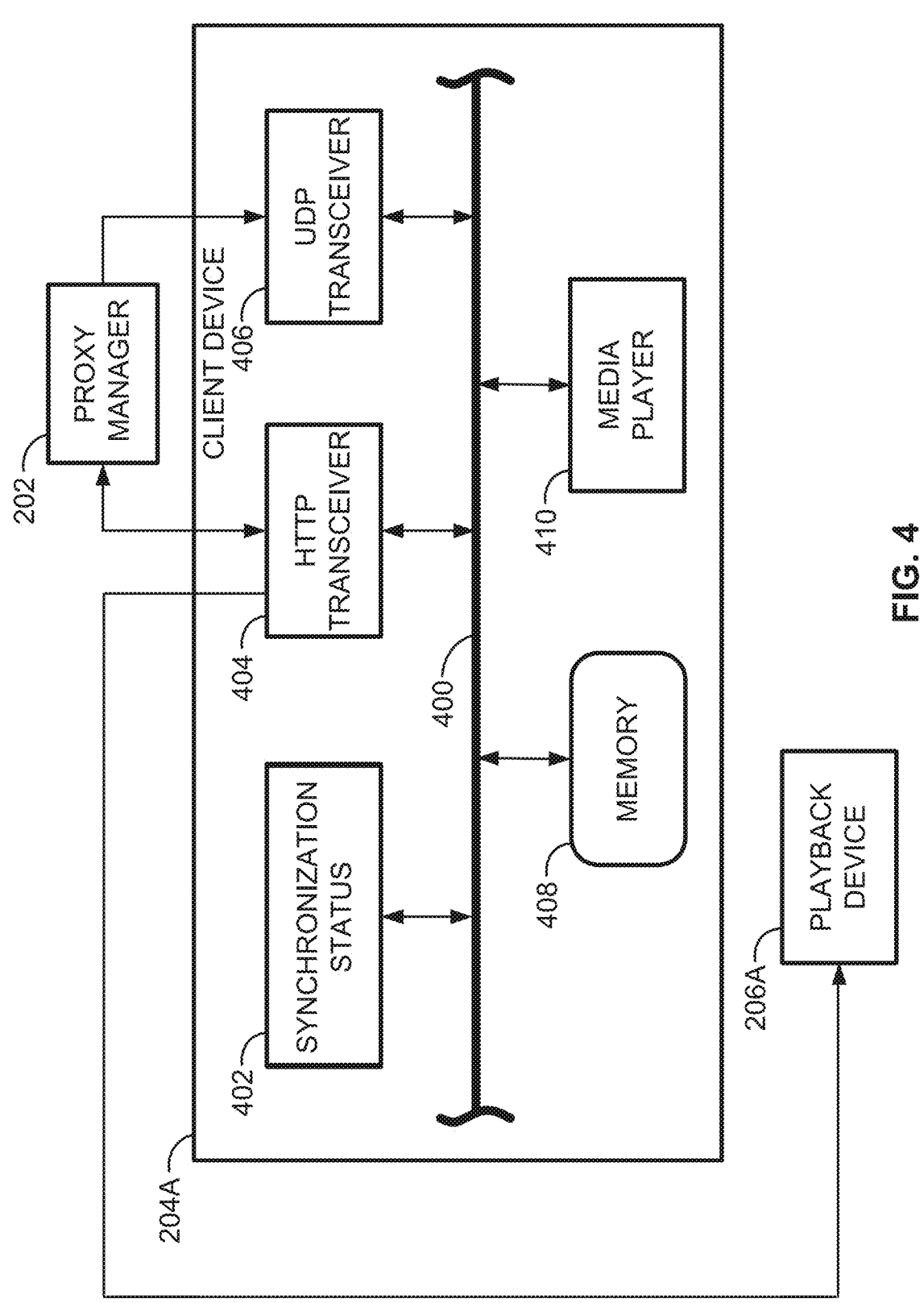
FIG. 4 is a block diagram of an example implementation of a client device of FIG. 2 to request media.

FIG. 4 is a block diagram of an example implementation of the client device 204A of FIG. 2 to request media. The client device 204A of FIG. 2 may be instantiated by programmable circuitry such as a Central Processor Unit (CPU) executing first instructions. Additionally or alternatively, the client device 204A of FIG. 2 may be instantiated by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers. FIG. 4 includes the local manager 202, the client device 204A, and the playback device 206. The client device 204A includes an example bus 400, example synchronization status circuitry 402, example HTTP transceiver circuitry 404, example UDP transceiver circuitry 406, example memory 408, and example media player circuitry 410.

In the example of FIG. 4, the synchronization status circuitry 402, HTTP transceiver circuitry 404, UDP transceiver circuitry 406, memory 408, and media player circuitry 410 implement the client device 204A. In some examples, the synchronization status circuitry 402, HTTP transceiver circuitry 404, UDP transceiver circuitry 406, memory 408, and media player circuitry 410 may additionally or alternatively implement the client device 204B and/or the smart device 208.

The bus 400 refers to one or more physical connections (e.g., an interconnect, copper trace, etc.) that enables communication between the internal components of the client device 204A. The bus 400 may be implemented using one or more communication systems that meet pre-determined threshold power and latency requirements.

The synchronization status circuitry 402 determines a status of media stream presentation in accordance with the teachings of this disclosure. In some examples, the synchronization status circuitry 402 receives requests from the local manager 202 to provide time stamps describing which portion of a media stream is currently being presented. In such examples, the synchronization status circuitry 402 determines the timestamps by identifying which portions of a media stream were last transmitted to the playback device 206A via the HTTP transceiver circuitry 404. If implemented in the smart device 208, the synchronization status circuitry 402 may determine the timestamps by identifying which portions of a media stream were last transmitted to a display module for presentation.

In some examples, the client device 204A receives seek instructions from the local manager 202. In such examples, the synchronization status circuitry 402 identifies the current time stamp of the media playback and compares the current time stamp to the time stamp requested of the local manager 202. The comparison enables the synchronization status circuitry 402 to determine whether the client device 204A has executed the seek instructions. The determination may then be sent back to the local manager 202 via HTTP transceiver circuitry 404 on the client device 204/smart device 208.

The HTTP transceiver circuitry 404 transmits and receives data with HTTP. For example, the HTTP transceiver circuitry 404 transmits a HTTP request for a media stream to the local manager 202 or report the status of the client device 204 in executing the seek instructions. The HTTP transceiver circuitry 404 also transmits a HTTP stream to the playback device 206A to enable presentation of the media stream.

The UDP transceiver circuitry 406 transmits and receives data with UDP. For example, the UDP transceiver circuitry 406 receives a copy of a UDP stream that has been multicasted from the local manager 202. In some examples, the client device 204A decapsulates the UDP stream back to a HTTP stream before presentation of the media stream.

The memory 408 stores data to facilitate the operations of the internal components of client device 204. In some examples, the memory 408 includes a buffer to temporarily store portions of an HTTP stream before the playback device 206A presents the portions of the HTTP stream.

The memory 408 may be implemented as any type of memory. For example, the memory 408 may be a volatile memory or a non-volatile memory. The volatile memory may be implemented by Synchronous Dynamic Random Access Memory (SDRAM), Dynamic Random Access Memory (DRAM), and/or any other type of RAM device. The non-volatile memory may be implemented by flash memory and/or any other desired type of memory device.

The media player circuitry 410 manages the image and audio data transmitted to the screen. For example, the media player circuitry 410 may implement one or more user interfaces used to present a channel guide, content search results, etc., on the playback device 206A. The media player circuitry 410 also receives an HTTP stream and determines when to provide various portions of video data to the playback device 206A for presentation. To determine what image and video data should be presented on the playback device 206A, the media player may also interpret control signals (button presses, voice commands, etc.) generated by a user and received with corresponding hardware.

In some examples, the media player circuitry 410 receives seek instructions from the local manager 202 via the HTTP transceiver circuitry 404. The local manager 202 may transmit the seek instructions after a determination that the presentation of the media stream on the playback device 206A is not in sync with the presentation of the same media stream on other devices in the multicast environment (e.g., the playback device 206B and/or the smart device 208).

Upon receiving the seek instructions, the media player circuitry 410 uses the buffer to execute the seek instructions in accordance with the teachings of this disclosure. To execute the seek instructions, the media player circuitry 410 may transmit a different portion of the HTTP stream to the playback device 206A than it would have without the seek instructions. For example, the media player circuitry 410 may skip the transmission of one or more chronologically ordered stream portions, causing the playback device 206A to fast forward through the media stream to a desired timestamp.

Figure 5:
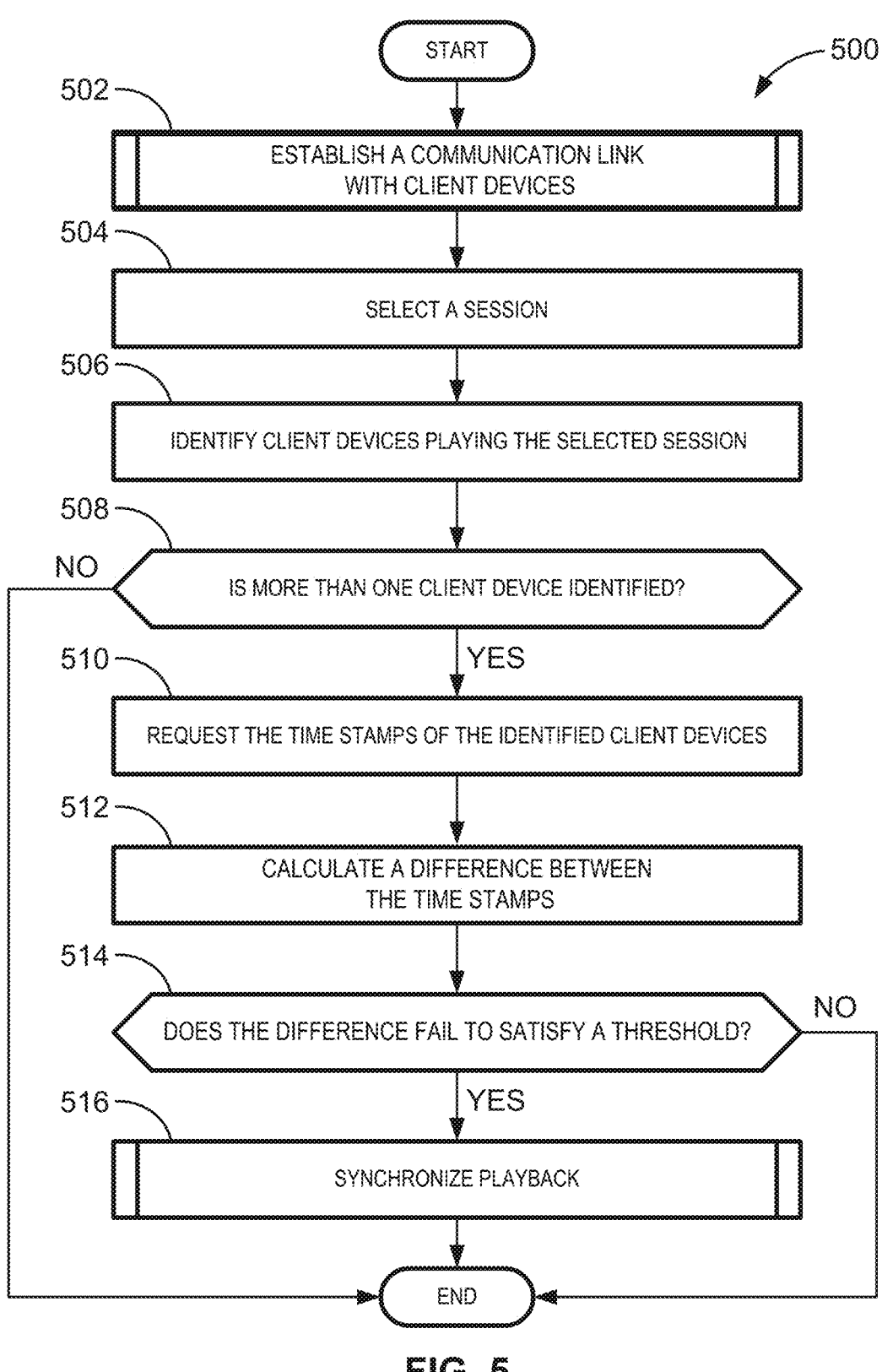
FIG. 5 is a flowchart representative of example machine readable instructions and/or example operations that may be executed, instantiated, and/or performed by programmable circuitry to implement the example multicast environment of FIG. 2.

FIG. 5 is a flowchart representative of example machine readable instructions and/or example operations 500 that may be executed, instantiated, and/or performed by programmable circuitry to synchronize media playback on multiple devices 204A, 204B, 208 (collectively devices 204, 208). The example machine-readable instructions and/or the example operations 500 of FIG. 5 begin at block 502, at which the UDP transceiver circuitry 308 and the HTTP transceiver circuitry 302 establish a communication link with the devices 204 and 208. In some examples, the local manager 202 includes multiple communication links depending on the type of data being communicated. Some such examples include UDP protocol communication for larger data such as video, images, etc. (e.g., using the UDP transceiver circuitry 308). Other examples include HTTP protocol for smaller data such as instructions to monitor media playback (e.g., using the HTTP transceiver circuitry 302). Using different transceivers to communicate certain data can reduce the possibility of buffering and increase the stability of the communication links.

Once the UDP transceiver circuitry 308 and the HTTP transceiver circuitry 302 establishes the communication link with the devices 204, 208, the synchronization manager circuitry 304 selects a session to monitor. (Block 504) In some examples, there may be multiple sessions running in the multicast environment 106 and the synchronization manager circuitry 304 monitors each session independently to verify the accuracy of the media playback on the devices 204, 208.

Once the synchronization manager circuitry 304 selects a session, the synchronization manager circuitry 304 identifies the devices 204, 208 playing the session selected. (Block 506). In some examples, multiple devices 204, 208 are playing a single session (e.g., multiple televisions are streaming the same media), and those devices 204, 208 are to be identified to monitor the media playback.

Once the devices 204, 208 are identified by the synchronization manager circuitry 304, the synchronization manager circuitry 304 determines whether more than one device 204, 208 has been identified. (Block 508). In some examples, where only a single device 204, 208 has been identified, the need for synchronizing the media playback is unnecessary since only one device 204, 208 is in use. Thus, when only on device 204, 208 is identified (e.g., block 508 returns a result of NO), the example machine-readable instructions and/or the example operations 500 of FIG. 5 ends.

When more than one device 204, 208 is identified as playing the session (e.g., block 508 returns a result of YES), the synchronization manager circuitry 304 requests the time stamps of the identified devices 204, 208. (Block 510). In some examples, the time stamp request includes a transmission, via the HTTP protocol using the HTTP transceiver circuitry 302, to the devices 204, 208 to report back to the local manager 202 a precise time in the media playback the device 204, 208 is on. In such an example, the time stamps of all devices 204, 208 can be compared to determine the accuracy and synchronization of the media playback.

Once the timestamps have been requested and received, the synchronization manager circuitry 304 calculates a time difference between the time stamps. (Block 512). In some examples, the difference is a subtraction of the highest time stamp (e.g., furthest along in the playback of the media) and the lowest time stamp (e.g., least far along in the playback of the media). In other examples, the time stamps collected are averaged across the number of devices 204, 208 playing the session and each time stamp is then subtracted from the average to determine how far each device 204, 208 is lagging/ahead. Any other method of calculating a difference or normalizing the time stamps may alternatively be used herein.

Once the synchronization manager circuitry 304 calculates the time difference, the synchronization manager circuitry 304 determines whether the calculated difference satisfies a threshold. (Block 514). In some examples, the difference threshold is determined by the user (e.g., the owner/renter of the devices 204, 208) based on their preferences, or is dynamically calculated/set by underlying logic (e.g., during the multicasting of the media playback). In other examples, the difference threshold is set by the local manager 202 based on how far off the devices 204, 208 should be before intervention (e.g., media synchronization) by the local manager 202. In some examples, the synchronization manager circuitry 304 determines that the calculated difference fails to satisfy the threshold if the calculated difference exceeds the threshold.

When the synchronization manager circuitry 304 determines that the calculated time difference does exceed the difference threshold (e.g., block 514 returns a result of YES), the synchronization manager circuitry 304 synchronizes the session playback. (Block 516). In some examples, the devices 204, 208 are manipulated by the local manager 202 to ensure that the playback of the media is synched across all devices 204, 208 in the session. Further information on the synchronization of the session playback is disclosed in further detail herein.

When the synchronization manager circuitry 304 synchronizes the media playback on the session or when the synchronization manager circuitry 304 determines that the calculated time difference does not exceed the difference threshold (e.g., block 514 returns a result of NO), the example machine-readable instructions and/or the example operations 500 of FIG. 5 ends.

FIG. 6 is a flowchart representative of example machine readable instructions and/or example operations 600 that may be executed, instantiated, and/or performed by programmable circuitry to establish a communication link between the local manager 202 and the devices 204, 208. The example machine-readable instructions and/or the example operations 600 of FIG. 6 begin at block 602, at which the HTTP transceiver circuitry 302 obtains stream data from the CDN 104. In some examples, the HTTP transceiver circuitry 302 uses an HTTP protocol for obtaining the stream data.

Once the stream data is obtained by the HTTP transceiver circuitry 302, the stream encapsulation circuitry 306 decapsulates the stream data from HTTP to UDP. (Block 604). In some examples, UDP is a more desired video communication protocol since it enables more data to be transmitted. In some examples, the UDP stream includes one or more packets of video data that are referred to as datagrams, such datagrams connected to the session.

Once the session datagrams are obtained by the encapsulation of the stream data by the stream encapsulation circuitry 306, the UDP transceiver circuitry 308 multicasts the UDP-encapsulated session datagrams to the devices 204, 208 using the UDP protocol. (Block 606). In some examples, the devices 204, 208 are distributed throughout the multicast environment 106 (e.g., a single room, a single building, etc.). During a session, each desired device 204, 208 which is to be a part of the session is linked with the local manager 202 through the UDP transceiver circuitry 308 to transmit video data to the devices 204, 208. In some examples, each client device 204 includes UDP transceiver circuitry 406 for communicating with the local manager 202 to receive the video data.

Once the devices 204, 208 receive the multicasted session datagrams from the UDP transceiver circuitry 308, the synchronization manager circuitry 304 instructs the device(s) 204, 208 to store a pre-determined amount of the session datagrams in the memory 408 on the client device. (Block 608). In some examples, the pre-determined amount of the session datagrams may be equal to one minute's worth of the session datagrams. In such an example, the device 204, 208 is able to playback the media and seek (e.g., move the media playback forward or backwards) up to the pre-defined stored session datagrams.

Once the UDP protocol connection has been established via the UDP transceiver circuitry 308, the HTTP transceiver circuitry 302 establishes an HTTP protocol connection with the devices 204, 208. (Block 610). In some examples, the HTTP protocol connection is used to transmit the seek instructions to the device 204, 208. In some examples, each device 204, 208 includes HTTP transceiver circuitry 404 for communicating with the local manager 202 to receive seek instructions.

Once both the UDP protocol connection and the HTTP protocol connection has been established between the local manager 202 and the devices 204, 208, the example machine-readable instructions and/or the example operations 600 of FIG. 6 returns to the example machine readable instructions and/or the example operations 500 of FIG. 5.

Figure 7:
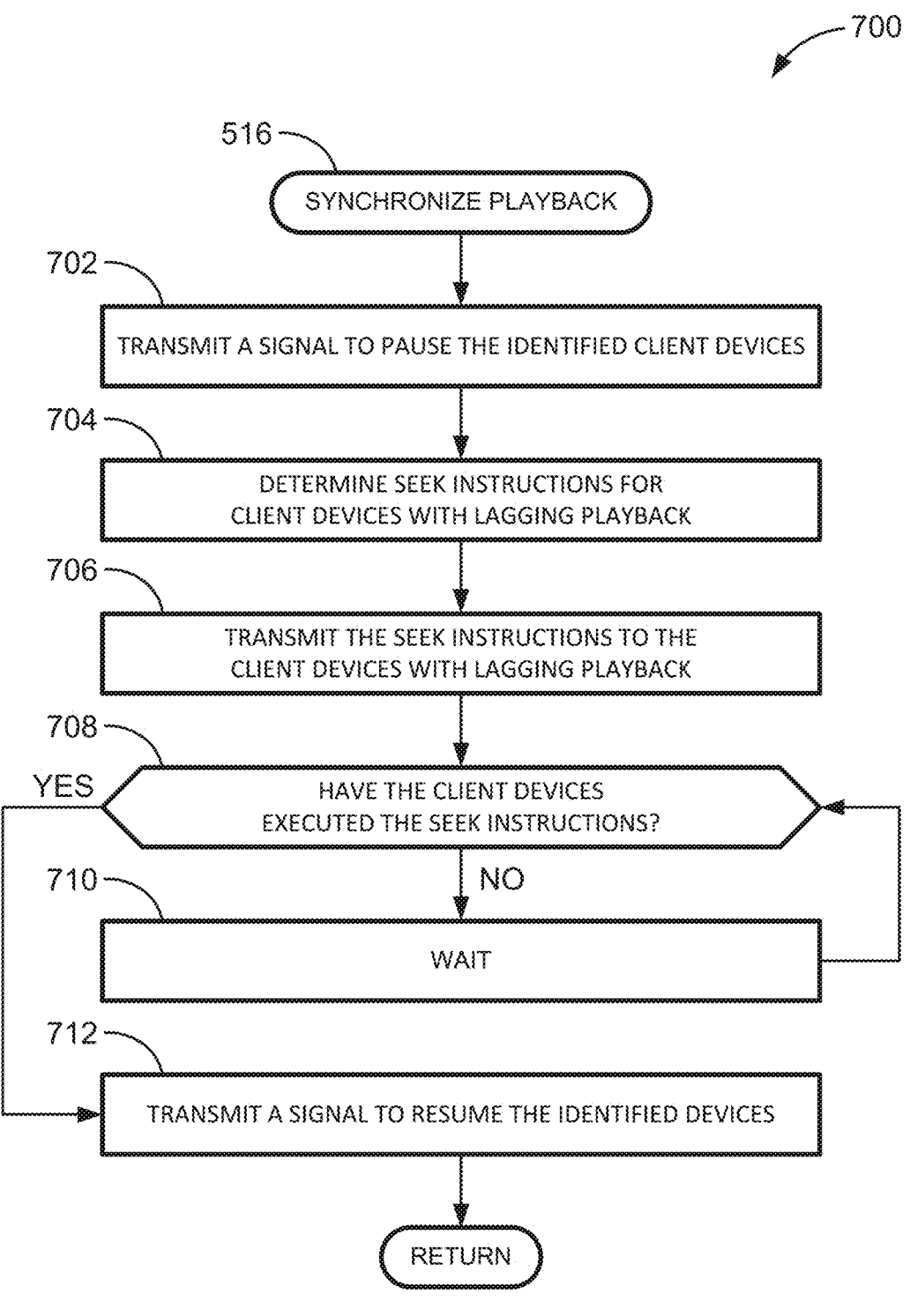
FIG. 7 is a flowchart representative of example machine readable instructions and/or example operations that may be executed, instantiated, and/or performed by example programmable circuitry to synchronize the media playback on an identified session within the example multicast environment of FIG. 2.

FIG. 7 is a flowchart representative of example machine readable instructions and/or example operations 700 that may be executed, instantiated, and/or performed by programmable circuitry to synchronize the media playback on an identified session within the multicast environment 106. The example machine-readable instructions and/or the example operations 700 of FIG. 7 begin at block 702, at which the HTTP transceiver circuitry 302 transmits a signal to pause the identified devices 204, 208. In some examples, all client devices are paused simultaneously. In some examples, the pause signal is transmitted via the HTTP protocol used to establish the connection with the devices 204, 208.

Once the HTTP transceiver circuitry 302 transmits the pause signal, the synchronization manager circuitry 304 determines seek instructions for the devices 204, 208. (Block 704). In some examples, the seek instructions include instructing certain devices 204, 208 to seek forward to a specific time stamp based on the calculated time difference between the time stamps (e.g., block 512 of FIG. 5). In some examples, the seek instructions include instructing certain devices 204, 208 to seek backwards to a specific time stamps also based on the calculated time difference between the time stamps. In some examples, the seek instructions include both seek forward and seek backward instructions to specific devices 204, 208.

When the synchronization manager circuitry 304 determines the seek instructions, the HTTP transceiver circuitry 302 transmits the seek instructions to the devices 204, 208. (Block 706). In some examples, the devices 204, 208 receive the seek instructions via the HTTP transceiver circuitry 404 on the devices 204, 208.

Once the seek instructions are sent via the HTTP transceiver circuitry 302, the synchronization manager circuitry 304 determines whether the devices 204, 208 have executed the seek instructions. (Block 708). In some examples, the synchronization status circuitry 402 on the devices 204, 208 record whether the device 204, 208 has received and/or executed the seek instructions. In some examples, the synchronization status circuitry 402 forms a signal to transmit back to the local manager 202 indicating a status of the seek instruction execution (e.g., pass, fail, not executed, etc.).

When the synchronization manager circuitry 304 determines that the devices 204, 208 have not executed the seek instructions (e.g., block 708 returns a result of NO), the synchronization manager circuitry 304 waits until the execution of the seek instructions has been completed. (Block 710). In some examples, the synchronization manager circuitry 304 checks the status of the seek instruction execution every cycle (e.g., every second, 100 milliseconds, etc.). In other examples, the synchronization manager circuitry 304 waits until it receives a signal from the devices 204, 208 indicating a status change of the seek instruction execution (e.g., not executed to passed, etc.).

When the synchronization manager circuitry 304 has determined that the seek instructions were executed (e.g., block 708 returns a result of YES), the HTTP transceiver circuitry 302 transmits a signal to the devices 204, 208 to resume the session on the devices 204, 208. (Block 712). When the HTTP transceiver circuitry 302 transmits the signal to resume the session on the devices 204, 208, the example machine-readable instructions and/or the example operations 700 of FIG. 7 ends.

Figure 8:
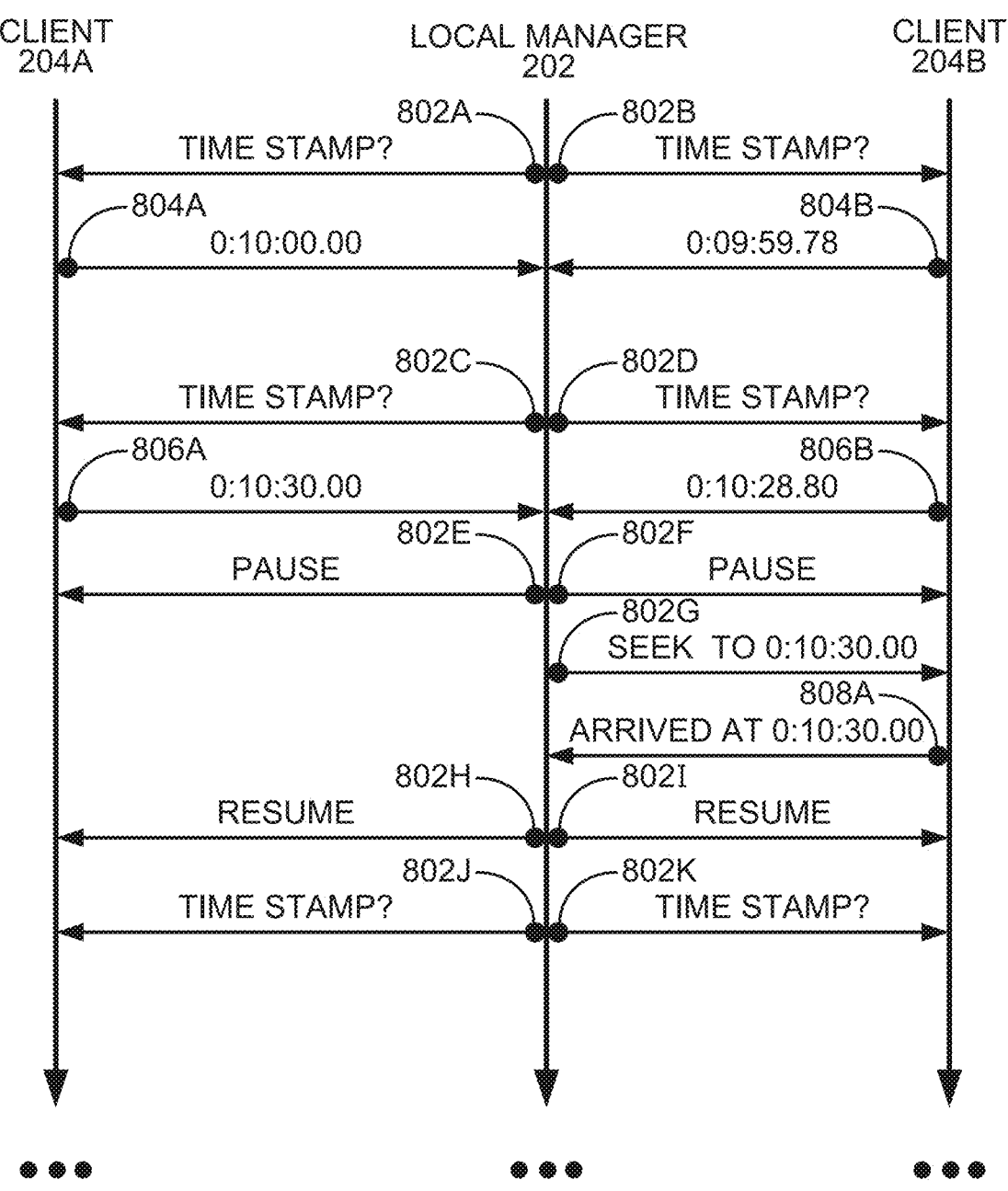
FIG. 8 is an example implementation of the example machine readable instructions of FIG. 7 to synchronize the media playback within the example multicast environment of FIG. 2.

FIG. 8 is an example implementation of the synchronize playback instructions 700 of FIG. 7. The example implementation of FIG. 8 includes the local manager 202, a first client device 204A, and a second client device 204B. While the example implementation of FIG. 8 shows two client devices 204, one of the client devices 204 can be interchanged with a smart device 208 as disclosed herein.

The example implementation of FIG. 8 begins where the local manager 202 requests the time stamp of the first client device 204A and the second client device 204B (point 802A and 802B respectively). The time stamp is subsequently sent back to the local manager 202 by the first and second client device 204A, 204B (point 804A and 804B respectively). In the example implementation of FIG. 8, the time stamp reported by the first client device 204A is a playback value of 0:10:00.00 (e.g., zero hours, ten minutes, zero seconds) and the time stamp reported by the second client device 204B is a playback value of 0:9:59.78 (e.g., zero hours, nine minutes, 59.78 seconds).

As disclosed above, in some examples, the local manager 202 only synchronizes the playback on the client devices 204 when the calculated time difference between the time stamps exceeds a certain threshold. In the example implementation of FIG. 8, the difference between the time stamps of the first and second client devices 204A, 204B is 0.22 seconds (e.g., ten minutes minus nine minutes and 59.78 seconds). Such an example may not exceed the threshold defined by the local manager 202 and thus does not trigger the head end to synchronize the playbacks.

The example implementation of FIG. 8 continues to check the time stamps of the first and second client devices 204A, 204B throughout a session. Thus, the local manager 202 requests another time stamp of the first and second client devices 204A, 204B (e.g., point 802C and 802D respectively).

In the example implementation of FIG. 8, the second time stamps requested (e.g., 802C and 802D) is returned by the first client device 204A (point 806A) as 0:10:30.00 and by the second client device 204B (point 806B) as 0:10:28.80. The calculated time difference between the second requested time stamps is 1.20 seconds. In the example implementation of FIG. 8, the example difference threshold is one second, and thus, the calculated time difference in the time stamps exceeds the threshold value and triggers the local manager 202 to synchronize the playbacks.

Once the calculated time difference exceeds the defined difference threshold triggering the local manager 202 to synchronize the playbacks, the local manager 202 sends a signal to the first and second client devices 204A, 204B (e.g., point 802E and 802F respectively) to pause the playbacks. Pausing the playbacks allows the client device 204 that is behind/ahead to seek to the desired time stamp. In the example implementation of FIG. 8, the second client device 204B is to seek forward to the time stamp of the first client device 204A.

After the local manager 202 sends the signal to pause the playbacks (e.g., 802E, 802F), the local manager 202 sends a signal to the second client device 204B to seek forward to the time stamp of the first client device 204A (e.g., point 802G). In the example implementation of FIG. 8, the second client device 204B seeks forward to 0:10:30.00.

Once the second client device 204B reaches the time stamp of 0:10:30.00, the second client device 204B sends a signal back to the local manager 202 indicating that the second client device 204B has reached the desired time stamp (e.g., point 808A).

When the local manager 202 receives the indication that the second client device 204B has reached the desired time stamp, the local manager 202 sends a signal to the client devices 204A, 204B to resume the playback (e.g., point 802H and 802I respectively). The example implementation of FIG. 8 then continues to check the time stamps of the first and second client devices 204A, 204B throughout a session (e.g., point 802J and 802K respectively). The local manager 202 may synchronize the playbacks of the client devices 204 multiple times throughout a session, and each synchronization begins with a request for the time stamps from the local manager 202.

Figure 9:
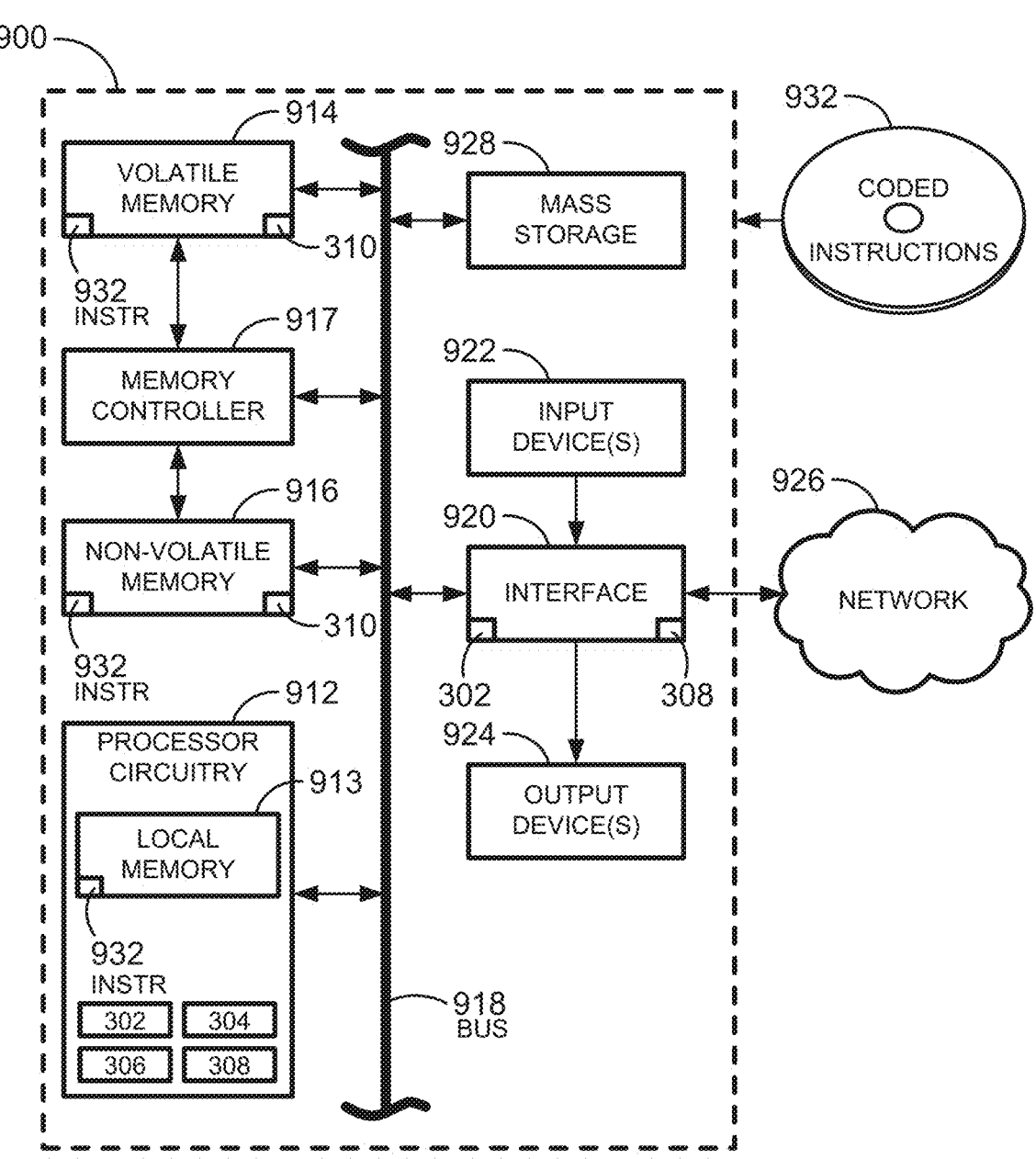
FIG. 9 is a block diagram of an example processing platform including programmable circuitry structured to execute, instantiate, and/or perform the example machine readable instructions and/or perform the example operations of FIGS. 5, 6, and/or 7 to implement the example multicast environment of FIG. 2.

FIG. 9 is a block diagram of an example programmable circuitry platform 900 structured to execute and/or instantiate the example machine-readable instructions and/or the example operations of FIGS. 5, 6, and/or 7 to implement the multicast environment 106 of FIG. 2. The programmable circuitry platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 900 of the illustrated example includes programmable circuitry 912. The programmable circuitry 912 of the illustrated example is hardware. For example, the programmable circuitry 912 can be implemented by one or more integrated circuits, logic circuits, FPGAs, microprocessors, CPUs, GPUs, DSPs, and/or microcontrollers from any desired family or manufacturer. The programmable circuitry 912 may be implemented by one or more semiconductor based (e.g., silicon based) devices. In this example, the programmable circuitry 912 implements HTTP transceiver circuitry 302, synchronization manager circuitry 304, stream encapsulation circuitry 306, and UDP transceiver circuitry 308.

The programmable circuitry 912 of the illustrated example includes a local memory 913 (e.g., a cache, registers, etc.). The programmable circuitry 912 of the illustrated example is in communication with main memory 914, 916, which includes a volatile memory 914 and a non-volatile memory 916, by a bus 918. The volatile memory 914 may be implemented by Synchronous Dynamic Random Access Memory (SDRAM), Dynamic Random Access Memory (DRAM), and/or any other type of RAM device. The non-volatile memory 916 may be implemented by flash memory and/or any other desired type of memory device. Access to the main memory 914, 916 of the illustrated example is controlled by a memory controller 917. In some examples, the memory controller 917 may be implemented by one or more integrated circuits, logic circuits, microcontrollers from any desired family or manufacturer, or any other type of circuitry to manage the flow of data going to and from the main memory 914, 916.

The programmable circuitry platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permits a user (e.g., a human user, a machine user, etc.) to enter data and/or commands into the programmable circuitry 912. The input device(s) 922 can be implemented by, for example, an audio sensor, a microphone, a camera (still or video), a keyboard, a button, a mouse, a touchscreen, a trackpad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a beyond-line-of-site wireless system, a line-of-site wireless system, a cellular telephone system, an optical connection, etc.

The programmable circuitry platform 900 of the illustrated example also includes one or more mass storage discs or devices 928 to store firmware, software, and/or data. Examples of such mass storage discs or devices 928 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 932, which may be implemented by the machine readable instructions of FIGS. 5, 6, and/or 7, may be stored in the mass storage device 928, in the volatile memory 914, in the non-volatile memory 916, and/or on at least one non-transitory computer readable storage medium such as a CD or DVD which may be removable.

Figure 10:
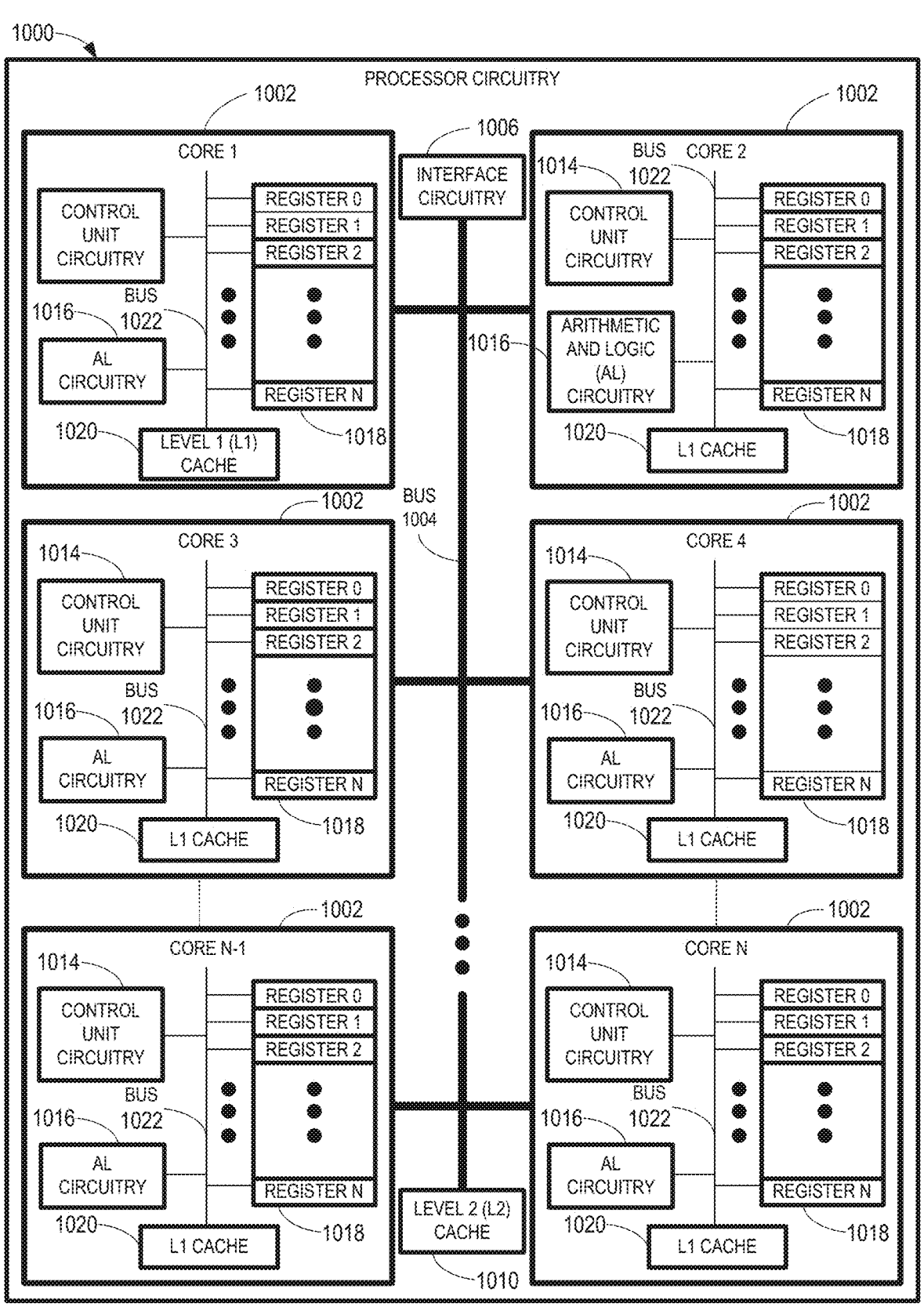
FIG. 10 is a block diagram of an example implementation of the programmable circuitry of FIG. 9.

FIG. 10 is a block diagram of an example implementation of the programmable circuitry 912 of FIG. 9. In this example, the programmable circuitry 912 of FIG. 9 is implemented by a microprocessor 1000. For example, the microprocessor 1000 may be a general-purpose microprocessor (e.g., general-purpose microprocessor circuitry). The microprocessor 1000 executes some or all of the machine-readable instructions of the flowcharts of FIGS. 5, 6, and/or 7 to effectively instantiate the circuitry of FIG. 2 as logic circuits to perform operations corresponding to those machine readable instructions. In some such examples, the circuitry of FIG. 2 is instantiated by the hardware circuits of the microprocessor 1000 in combination with the machine-readable instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 5, 6, and/or 7.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating-point operations. In yet other examples, the AL circuitry 1016 may include first AL circuitry that performs integer-based operations and second AL circuitry that performs floating-point operations. In some examples, the AL circuitry 1016 may be referred to as an Arithmetic Logic Unit (ALU).

The registers 1018 are semiconductor-based structures to store data and/or instructions such as results of one or more of the operations performed by the AL circuitry 1016 of the corresponding core 1002. For example, the registers 1018 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure, such as by being distributed throughout the core 1002 to shorten access time. The second bus 1022 may be implemented by at least one of an I2C bus, a SPI bus, a PCI bus, or a PCIe bus.

Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages.

The microprocessor 1000 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1000, in the same chip package as the microprocessor 1000 and/or in one or more separate packages from the microprocessor 1000.

Figure 11:
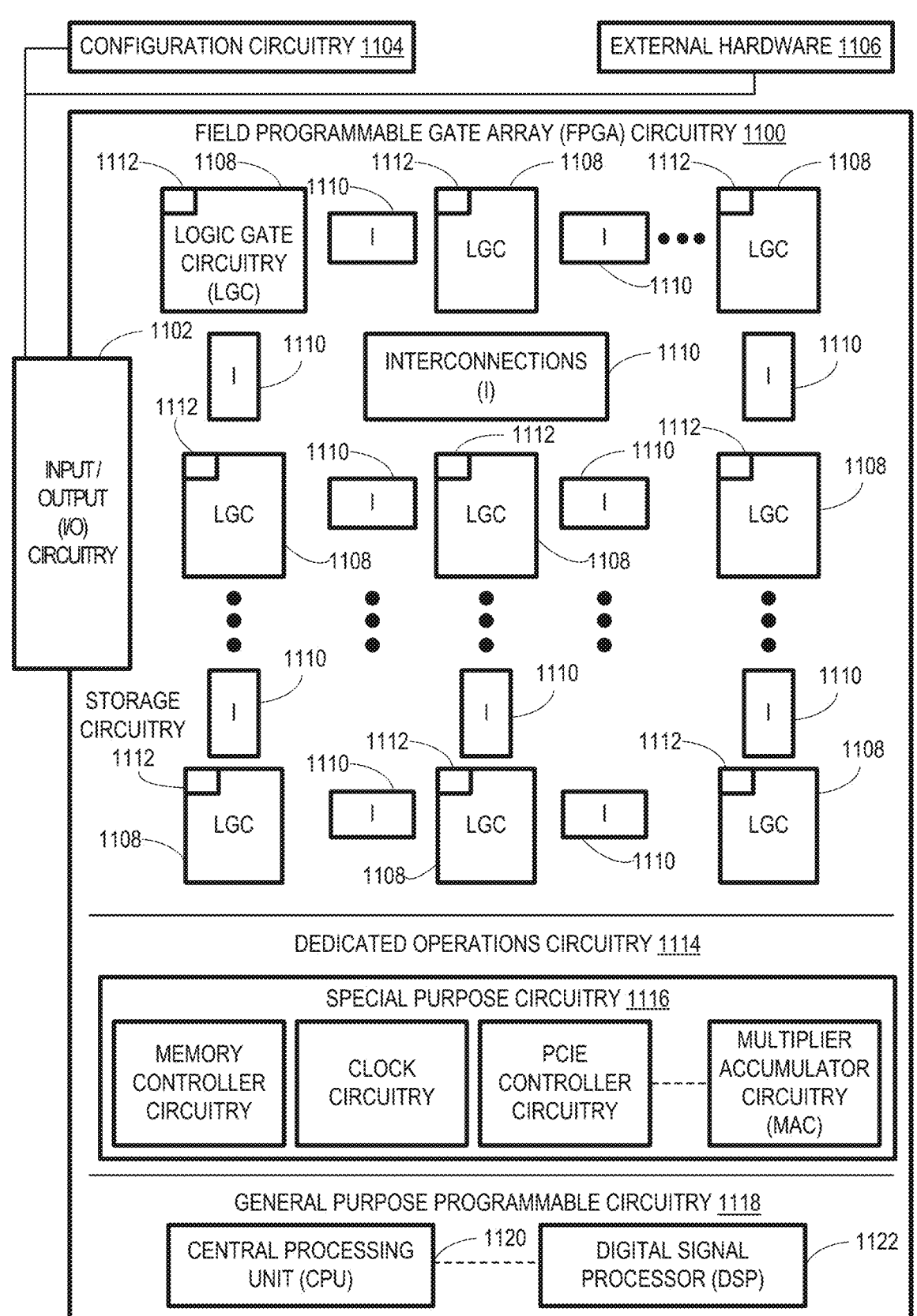
FIG. 11 is a block diagram of another example implementation of the programmable circuitry of FIG. 9.

FIG. 11 is a block diagram of another example implementation of the programmable circuitry 912 of FIG. 9. In this example, the programmable circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1000 of FIG. 10 described above (which is a general purpose device that may be programmed to execute some or all of the machine readable instructions represented by the flowchart(s) of FIGS. 5, 6, and/or 7 but whose interconnections and logic circuitry are fixed once fabricated), the FPGA circuitry 1100 of the example of FIG. 11 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 5, 6, and/or 7. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 5, 6, and/or 7. As such, the FPGA circuitry 1100 may be configured and/or structured to effectively instantiate some or all of the operations/functions corresponding to the machine readable instructions of the flowchart(s) of FIGS. 5, 6, and/or 7 as dedicated logic circuits to perform the operations/functions corresponding to those software instructions in a dedicated manner analogous to an ASIC. Therefore, the FPGA circuitry 1100 may perform the operations/functions corresponding to the some or all of the machine readable instructions of FIGS. 5, 6, and/or 7 faster than the general-purpose microprocessor can execute the same.

In the example of FIG. 11, the FPGA circuitry 1100 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1100 of FIG. 11 may access and/or load the binary file to cause the FPGA circuitry 1100 of FIG. 11 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1100 of FIG. 11 to cause configuration and/or structuring of the FPGA circuitry 1100 of FIG. 11, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1100 of FIG. 11 may access and/or load the binary file to cause the FPGA circuitry 1100 of FIG. 11 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1100 of FIG. 11 to cause configuration and/or structuring of the FPGA circuitry 1100 of FIG. 11, or portion(s) thereof.

The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain a binary file, which may be implemented by a bit stream, data, and/or machine-readable instructions, to configure the FPGA circuitry 1100, or portion(s) thereof. In some such examples, the configuration circuitry 1104 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1106 may be implemented by external hardware circuitry. For example, the external hardware 1106 may be implemented by the microprocessor 1000 of FIG. 10.

The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations/functions that may correspond to at least some of the machine readable instructions of FIGS. 5, 6, and/or 7 and/or other desired operations. The logic gate circuitry 1108 shown in FIG. 11 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations/functions. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example dedicated operations circuitry 1114. In this example, the dedicated operations circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the programmable circuitry 912 of FIG. 9, many other approaches are contemplated. For example, FPGA circuitry may include an on-board CPU, such as one or more of the example CPU 1120 of FIG. 10. Therefore, the programmable circuitry 912 of FIG. 9 may additionally be implemented by combining at least the example microprocessor 1000 of FIG. 10 and the example FPGA circuitry 1100 of FIG. 11. In some such hybrid examples, one or more cores 1002 of FIG. 10 may execute a first portion of the machine readable instructions represented by the flowchart(s) of FIGS. 5, 6, and/or 7 to perform first operation(s)/function(s), the FPGA circuitry 1100 of FIG. 11 may be configured and/or structured to perform second operation(s)/function(s) corresponding to a second portion of the machine readable instructions represented by the flowcharts of FIGS. 5, 6, and/or 7, and/or an ASIC may be configured and/or structured to perform third operation(s)/function(s) corresponding to a third portion of the machine readable instructions represented by the flowcharts of FIGS. 5, 6, and/or 7.

It should be understood that some or all of the circuitry of FIG. 2 may, thus, be instantiated at the same or different times. For example, same and/or different portion(s) of the microprocessor 1000 of FIG. 10 may be programmed to execute portion(s) of machine-readable instructions at the same and/or different times. In some examples, same and/or different portion(s) of the FPGA circuitry 1100 of FIG. 11 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 1000 of FIG. 10 may execute machine readable instructions in one or more threads executing concurrently and/or in series. In some examples, the FPGA circuitry 1100 of FIG. 11 may be configured and/or structured to carry out operations/functions concurrently and/or in series. Moreover, in some examples, some or all of the circuitry of FIG. 2 may be implemented within one or more virtual machines and/or containers executing on the microprocessor 1000 of FIG. 10.

In some examples, the programmable circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the programmable circuitry 912 of FIG. 9, which may be in one or more packages. For example, the XPU may include a CPU (e.g., the microprocessor 1000 of FIG. 10, the CPU 1120 of FIG. 11, etc.) in one package, a DSP (e.g., the DSP 1122 of FIG. 11) in another package, a GPU in yet another package, and an FPGA (e.g., the FPGA circuitry 1100 of FIG. 11) in still yet another package.

Figure 12:
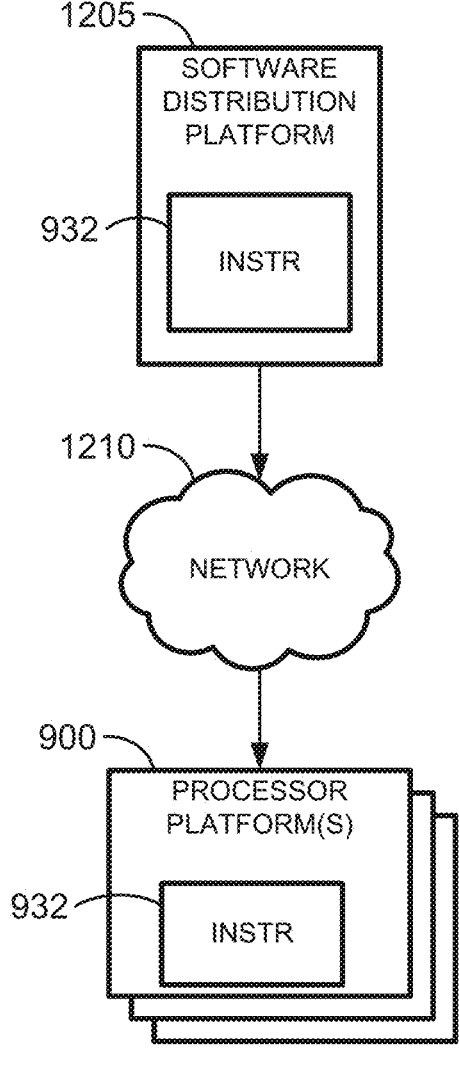
FIG. 12 is a block diagram of an example software/firmware/instructions distribution platform (e.g., one or more servers) to distribute software, instructions, and/or firmware (e.g., corresponding to the example machine readable instructions of FIGS. 5, 6, and/or 7) to a head end device and/or client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to other hardware devices (e.g., hardware devices owned and/ or operated by third parties from the owner and/or operator of the software distribution platform) is illustrated in FIG. 12. The software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions of FIGS. 5, 6, and/or 7, as described above. The one or more servers of the software distribution platform 1205 are in communication with an example network 1210, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions of FIGS. 5, 6, and/or 7, may be downloaded to the programmable circuitry platform 900, which is to execute the machine readable instructions 932 to implement the multicast environment 106. In some examples, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices. Although referred to as software above, the distributed "software" could alternatively be firmware.

From the foregoing, it will be appreciated that example systems, apparatus, articles of manufacture, and methods have been disclosed that synchronize media playback at devices in a multicast environment. Disclosed systems, apparatus, articles of manufacture, and methods improve the efficiency of using a computing device by enabling client devices to synchronize the playback of media via instructions issued by a head end server in a multicast environment. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to synchronize media playback at devices in a multicast environment are disclosed herein. Further examples and combinations thereof include the following:

Example 1 includes a system to synchronize media playback, the system comprising programmable circuitry, and a memory that stores executable instructions that, when executed or instantiated by the programmable circuitry, facilitate performance of operations, comprising transmitting, using a hypertext transfer protocol (HTTP), a first request in a first HTTP message to a first client device and to a second client device, receiving, from the first client device in response to the first request. a first time stamp associated with a first presentation, the first time stamp representing a first playback time within the first presentation, receiving, from the second client device in response to the first request, a second time stamp associated with a second presentation, the second time stamp representing a second playback time within the second presentation, calculating a time difference between the first time stamp and the second time stamp, determining whether the time difference satisfies a threshold, transmitting a second HTTP message to the first client device and the second client device in response to a determination that the time difference fails to satisfy the threshold, the second HTTP message to cause the first client device to pause the first presentation and the second client device to pause the second presentation, transmitting seek instructions in a third HTTP message to the second client device, the seek instructions to cause the second client device to synchronize the second presentation to the first presentation by setting the first and second playback times equal, and transmitting a fourth HTTP message to cause the first client device to resume the first presentation and the second client device to resume the second presentation.

Example 2 includes the system of example 1, wherein the programmable circuitry is to obtain session data from a content delivery network, encapsulate the session data using User Datagram Protocol (UDP) to obtain session datagrams, and multicast, using UDP, the session datagrams to the first client device and the second client device to enable the first presentation and the second presentation.

Example 3 includes the system of example 1, wherein the first presentation and the second presentation are located within a multicast environment.

Example 4 includes the system of example 1, wherein the programmable circuitry is to utilize a first HTTP protocol to communicate with the first client device, and utilize a second HTTP protocol to communicate with the second client device, the first HTTP protocol incompatible with the second HTTP protocol.

Example 5 includes the system of example 1, wherein the seek instructions cause both an audio signal and an image signal corresponding to the second presentation to move to the first time stamp.

Example 6 includes the system of example 1, wherein the programmable circuitry is to determine whether the second client device implemented the seek instructions.

Example 7 includes the system of example 1, wherein the first client device and the second client device include a memory to store the first presentation and the second presentation.

Example 8 includes the system of example 7, wherein the memory is to store a pre-determined amount of the first presentation and the second presentation to enable the programmable circuitry to at least one of instantiate or execute the seek instructions on the second client device.

Example 9 includes a non-transitory machine readable storage medium comprising instructions to cause programmable circuitry to at least transmit, using a hypertext transfer protocol (HTTP), a first request in a first HTTP message to a first client device and to a second client device, receive, from the first client device in response to the first request. a first time stamp associated with a first presentation, the first time stamp representing a first playback time within the first presentation, receive, from the second client device in response to the first request, a second time stamp associated with a second presentation, the second time stamp representing a second playback time within the second presentation, calculate a time difference between the first time stamp and the second time stamp, determine whether the time difference satisfies a threshold, transmit a second HTTP message to the first client device and the second client device in response to a determination that the time difference fails to satisfy the threshold, the second HTTP message to cause the first client device to pause the first presentation and the second client device to pause the second presentation, transmit seek instructions in a third HTTP message to the second client device, the seek instructions to cause the second client device to synchronize the second presentation to the first presentation by setting the first and second playback times equal, and transmit a fourth HTTP message to cause the first client device to resume the first presentation and the second client device to resume the second presentation.

Example 10 includes the non-transitory machine readable storage medium of example 9, wherein the instructions cause the programmable circuitry to obtain session data from a content delivery network, encapsulate the session data using User Datagram Protocol (UDP) to obtain session datagrams, and multicast, using UDP, the session datagrams to the first client device and the second client device to enable the first presentation and the second presentation.

Example 11 includes the non-transitory machine readable storage medium of example 9, wherein the first presentation and the second presentation are located within a multicast environment.

Example 12 includes the non-transitory machine readable storage medium of example 9, wherein the instructions cause the programmable circuitry to utilize a first HTTP protocol to communicate with the first client device, and utilize a second HTTP protocol to communicate with the second client device, the first HTTP protocol incompatible with the second HTTP protocol.

Example 13 includes the non-transitory machine readable storage medium of example 9, wherein the seek instructions cause both an audio signal and an image signal corresponding to the second presentation to move to the first time stamp.

Example 14 includes the non-transitory machine readable storage medium of example 9, wherein the instructions cause the programmable circuitry to determine whether the second client device implemented the seek instructions.

Example 15 includes the non-transitory machine readable storage medium of example 9, wherein the instructions cause the programmable circuitry to store the first presentation and the second presentation on a memory on the first client device and the second client device.

Example 16 includes the non-transitory machine readable storage medium of example 15, wherein the memory stores a pre-determined amount of the first presentation and the second presentation to enable the instructions to cause the programmable circuitry to execute the seek instructions on the second client device.

Example 17 includes a method comprising transmitting, using a hypertext transfer protocol (HTTP), a first request in a first HTTP message to a first client device and to a second client device, receiving, from the first client device in response to the first request. a first time stamp associated with a first presentation, the first time stamp representing a first playback time within the first presentation, receiving, from the second client device in response to the first request, a second time stamp associated with a second presentation, the second time stamp representing a second playback time within the second presentation, calculating a time difference between the first time stamp and the second time stamp, determining whether the time difference satisfies a threshold, transmitting a second HTTP message to the first client device and the second client device in response to a determination that the time difference fails to satisfy the threshold, the second HTTP message to cause the first client device to pause the first presentation and the second client device to pause the second presentation, transmitting seek instructions in a third HTTP message to the second client device, the seek instructions to cause the second client device to synchronize the second presentation to the first presentation by setting the first and second playback times equal, and transmitting a fourth HTTP message to cause the first client device to resume the first presentation and the second client device to resume the second presentation.

Example 18 includes the method of example 17, further including obtaining session data from a content delivery network, encapsulating the session data using User Datagram Protocol (UDP) to obtain session datagrams, and multicasting, using UDP, the session datagrams to the first client device and the second client device to enable the first presentation and the second presentation.

Example 19 includes the method of example 17, wherein the first presentation and the second presentation are located within a multicast environment.

Example 20 includes the method of example 17, further including establishing a first HTTP protocol to communicate with the first client device, and establishing a second HTTP protocol to communicate with the second client device, the first HTTP protocol incompatible with the second HTTP protocol.

Example 21 includes the method of example 17, wherein the seek instructions cause both an audio signal and an image signal corresponding to the second presentation to move to the first time stamp.

Example 22 includes the method of example 17, further including determining whether the second client device implemented the seek instructions.

Example 23 includes the method of example 17, further including storing the first presentation and the second presentation on a memory on the first client device and the second client device.

Example 24 includes the method of example 23, wherein the memory stores a pre-determined amount of the first presentation and the second presentation to enable the seek instructions to cause the second client device to move the second presentation to the first time stamp.

Example 25 includes an apparatus comprising means for communicating with client devices using a hypertext transfer protocol (HTTP), means for encapsulating an HTTP data stream to a UDP data stream, the UDP data stream including session datagrams, means for transmitting the session datagrams to the client devices using UDP, and means for managing synchronization requests on the client devices, the means for managing synchronization requests to synchronize media playback at the client devices.

Example 26 includes the apparatus of example 25, wherein the means for communicating is to transmit a first request in a first hypertext transfer protocol (HTTP) message, the first request for a first time stamp corresponding to a first playback time of a first presentation of a session by a first client device and a second time stamp corresponding to a second playback time of a second presentation of the session by a second client device.

Example 27 includes the apparatus of example 26, wherein the means for managing synchronization requests is to calculate a time difference between the first time stamp and the second time stamp, determine whether the time difference satisfies a threshold, and determine seek instructions for the second client device.

Example 28 includes the apparatus of example 27, wherein the means for communicating is to transmit a second HTTP message in response to a determination that the time difference fails to satisfy the threshold, the second HTTP message to cause the first client device to pause the first presentation and the second client device to pause the second presentation, transmit the seek instructions in a third HTTP message to the second client device, the seek instructions to cause the second client device to synchronize the second presentation to the first presentation by setting the first and second playback times equal, and transmit a fourth HTTP message to cause the first client device to resume the first presentation and the second client device to resume the second presentation.

Example 29 includes the apparatus of example 28, wherein the means for managing synchronization requests is to determine whether the second client device implemented the seek instructions.

The following claims are hereby incorporated into this Detailed Description by this reference. Although certain systems, apparatus, articles of manufacture, and methods have been disclosed herein, these are presented as illustrative examples for purposes of providing a teaching disclosure, and the scope of coverage of this patent is not limited thereto. On the contrary, this patent covers all systems, apparatus, articles of manufacture, and methods fairly falling within the scope of the claims of this patent.

What is claimed is:

1. A system to synchronize media playback, the system comprising:

programmable circuitry; and a memory that stores executable instructions that, when executed or instantiated by the programmable circuitry, facilitate performance of operations, comprising:

obtaining stream data from a content delivery network;

decapsulating the stream data to a first data and a second data;

multicasting the first data to a first device and the second data to a second device;

storing a pre-determined amount of time of the first data and the second data to the first device and the second device, a playback of the stream data based on the pre-determined amount of time; and in response to a determination that a difference between a first time stamp of the first device and a second time stamp of the second device is less than the stored pre-determined amount of time, synchronizing the first device and the second device.

2. The system of claim 1, wherein the operations include obtaining the stream data from the content delivery network further includes obtaining the stream data using a hypertext transfer protocol (HTTP).

3. The system of claim 2, wherein decapsulating the stream data to the first data and the second data further includes:

decapsulating the stream data from the HTTP protocol to a user datagram protocol (UDP); and determining a first data packet and a second data packet from the UDP.

4. The system of claim 1, wherein the operations include determining the playback of the stream data based on a difference between a first time stamp of the first device and a second time stamp of the second device.

5. The system of claim 1, wherein the operations include establishing an HTTP protocol connection between the system, the first device, and the second device.

6. The system of claim 5, wherein the operations include utilizing the HTTP protocol connection to communicate seek instructions to the first device and the second device.

7. The system of claim 1, wherein the operations include establishing a multicast environment to include the first device and the second device.

8. A non-transitory machine-readable storage medium comprising instructions to cause programmable circuitry to at least:

obtain stream data from a content delivery network;

decapsulate the stream data to a first data and a second data;

multicast the first data to a first device and the second data to a second device;

store a pre-determined amount of time of the first data and the second data to the first device and the second device, a playback of the stream data based on the pre-determined amount of time; and in response to a determination that a difference between a first time stamp of the first device and a second time stamp of the second device is less than the stored pre-determined amount of time, synchronize the first device and the second device.

9. The non-transitory machine-readable storage medium of claim 8, wherein to obtain the stream data from the content delivery network the instructions cause the programmable circuitry to obtain the stream data using a hypertext transfer protocol (HTTP).

10. The non-transitory machine-readable storage medium of claim 9, wherein to decapsulate the stream data to the first data and the second data the instructions cause the programmable circuitry to:

decapsulate the stream data from the HTTP protocol to a user datagram protocol (UDP); and determine a first data packet and a second data packet from the UDP.

11. The non-transitory machine-readable storage medium of claim 8, wherein the instructions cause the programmable circuitry to determine the playback of the stream data based on a difference between a first time stamp of the first device and a second time stamp of the second device.

12. The non-transitory machine-readable storage medium of claim 8, wherein the instructions cause the programmable circuitry to establish an HTTP protocol connection between the programmable circuitry, the first device, and the second device.

13. The non-transitory machine-readable storage medium of claim 12, wherein the instructions cause the programmable circuitry to utilize the HTTP protocol connection to communicate seek instructions to the first device and the second device.

14. The non-transitory machine-readable storage medium of claim 8, wherein the instructions cause the programmable circuitry to establish a multicast environment to include the first device and the second device.

15. A method to synchronize media playback, the method comprising:

obtaining stream data from a content delivery network;

decapsulating the stream data to a first data and a second data;

multicasting the first data to a first device and the second data to a second device; and storing a pre-determined amount of time of the first data and the second data to the first device and the second device, a playback of the stream data based on the pre-determined amount of time; and in response to a determination that a difference between a first time stamp of the first device and a second time stamp of the second device is less than the stored pre-determined amount of time, synchronizing the first device and the second device.

16. The method of claim 15, wherein obtaining the stream data from the content delivery network includes obtaining the stream data using a hypertext transfer protocol (HTTP).

17. The method of claim 15, including determining the play back of the stream data based on a difference between a first time stamp of the first device and a second time stamp of the second device.

18. The method of claim 16, wherein decapsulating the stream data to the first data and the second data includes:

decapsulating the stream data from the HTTP protocol to a user datagram protocol (UDP); and determining a first data packet and a second data packet from the UDP.

19. The method of claim 15, including establishing an HTTP protocol connection between the first device and the second device.

20. The method of claim 19, including utilizing the HTTP protocol connection to communicate seek instructions to the first device and the second device.

\* \* \* \* \*